United States Patent
Rangarajan et al.

(10) Patent No.: US 7,921,061 B2
(45) Date of Patent: Apr. 5, 2011

(54) SYSTEM AND METHOD FOR SIMULTANEOUS PRICE OPTIMIZATION AND ASSET ALLOCATION TO MAXIMIZE MANUFACTURING PROFITS

(75) Inventors: Keshava Rangarajan, Foster City, CA (US); Saurabh Thapliyal, San Mateo, CA (US); Sharad Santhanam, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 861 days.

(21) Appl. No.: 11/850,558

(22) Filed: Sep. 5, 2007

(65) Prior Publication Data
US 2009/0063251 A1 Mar. 5, 2009

(51) Int. Cl.
*G06F 17/00* (2006.01)
*G06F 17/50* (2006.01)

(52) U.S. Cl. .......................... 705/400; 705/7
(58) Field of Classification Search ............ 705/400, 705/7, 10, 28, 29, 30, 32; 703/2, 6, 23
See application file for complete search history.

(56) References Cited

U.S. PATENT DOCUMENTS

| | | | | |
|---|---|---|---|---|
| 5,608,621 A * | 3/1997 | Caveney et al. | | 705/10 |
| 7,287,000 B2 * | 10/2007 | Boyd et al. | | 705/10 |
| 7,660,734 B1 * | 2/2010 | Neal et al. | | 705/10 |
| 2002/0152111 A1 * | 10/2002 | Cox et al. | | 705/10 |
| 2002/0156663 A1 * | 10/2002 | Weber et al. | | 705/7 |
| 2003/0177103 A1 * | 9/2003 | Ivanov et al. | | 705/400 |
| 2003/0220830 A1 * | 11/2003 | Myr | | 705/10 |
| 2005/0256778 A1 * | 11/2005 | Boyd et al. | | 705/26 |
| 2007/0050235 A1 * | 3/2007 | Ouimet | | 705/10 |

FOREIGN PATENT DOCUMENTS

| | | | |
|---|---|---|---|
| EP | 0999418 | * | 5/2000 |
| WO | WO 2005/059685 | * | 6/2005 |

* cited by examiner

*Primary Examiner* — Igor Borissov
(74) *Attorney, Agent, or Firm* — Kilpatrick Townsend & Stockton LLP

(57) ABSTRACT

Systems and methods in accordance with various embodiments of the present invention provide for a system and method for simultaneous price optimization and asset allocation to maximize manufacturing profits. In one embodiment, a set of price points for the item and a set of expected demand values for each price point are determined. A supply-side constraint which models inventory, replenishment, and capacities associated with replenishment and a joining constraint, which requires that the set of expected demand values be equal to a planned supply of the item, are determined. A demand-side constraint is determined. Further, an objective function to maximize profits is determined, based on the set of price points, the set of expected demand values, and subject to the supply-side, joining, and demand-side constraints. Based on the objective function, an optimal price profile for the item is provided.

19 Claims, 5 Drawing Sheets

SYSTEM AND METHOD FOR SIMULTANEOUS PRICE OPTIMIZATION AND ASSET ALLOCATION TO MAXIMIZE MANUFACTURING PROFITS

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

This invention relates generally to the maximization of manufacturing profits and, more particularly, to a method and system for simultaneous price optimization and asset allocation to maximize manufacturing profits.

2. Description of the Related Art

In the domains of travel/transportation, hospitality, retail, stores and companies are in business to sell merchandise and other products to make a profit. In the retail context, store managers are most concerned with product-related marketing and decisions such as product placement, assortment, space, price, promotion, and inventory reduction. If the products are non-optimized in terms of these product decisions, then sales can be lost, costs could be higher, and profit will be less than what would otherwise be possible in an optimal system. For example, if the price is too high or too low, profit can be lost. If promotions are not properly targeted, then marketing efforts will be wasted. In order to maximize the outcome of product related decisions, many of these domains have used statistical modeling and strategic planning to optimize the decision making process for each of the product decisions. The objective for price optimization has been pricing the product for existing inventory reduction. These solutions find optimal prices for everyday/dynamic pricing, pricing for promotions, and pricing for markdowns (e.g. discontinued products). Current price optimization solutions deal with only finished goods and the depletion of an existing picture of inventory of the finished goods.

Thus, existing price optimization solutions do not deal with the unique challenges in the manufacturing industry. In manufacturing, the traditional picture of inventory includes accounting for replenishment. However, price optimizations have failed to consider optimal inventory allocation of both finished goods as well as their component parts, and replenishment of both finished goods as well as their component parts.

Although, revenue management solutions for the travel/transportation, hospitality, retail, and Consumer Packaged Goods (CPG) domains consider optimal inventory allocation of finished goods, these solutions do not consider allocation of component parts or replenishment of finished goods inventories and component part inventories. Moreover, these solution fail to consider the supply chain of the finished goods and the impact of capacity and other constraints present in the supply chain.

Supply chain planning solutions generally implement order fulfillment using what the industry refers to as a "supply plan." A supply plan is a tactical tool which has a plan horizon, generally of the order of a few weeks. The supply plan combines current product supply and projections of customer demand with supply-side constraints (for example, material requirements, capacity requirements, product manufacturing, and assembly times) to determine future planned supplies. These supplies are then output to near-term execution level systems which use supply plans to fulfill customer requests. Such execution system are often referred to as available-to-promise (ATP) systems where available-to-promise refers to the ability to promise product availability based on a pre-defined statement of current and planned supply and capacity (the supply plan). Using a supply plan, ATP systems are able to associate product quantities with the dates such products are scheduled to be available for shipment. ATP systems use this information to promise delivery of the products to customers by specific dates. Although the supply plans consider optimal inventory allocation of both finished goods and component parts, supply chain management fails to perform price optimization. Moreover, supply plans typically do not consider price to be variable.

Existing solutions for price-revenue-supply chain optimizations have significant shortcomings. One approach performs price optimization separately without consideration of the inventory. Once the optimal prices are determined, the prices may be fed into a supply chain module to produce recommendations for inventory levels. However, this feasible but sub-optimal solution does not provide an accurate model of the problem, failing to consider inventory replenishment or supply-side constraints. This solution does not capture multi-item interaction between the profit, price, demand, satisfiable demand and supply-side constraints, and the uncertainty and non-linearity in the demand. Another feasible, but sub-optimal approach performs price optimization for a set of finished goods taking into consideration only the on-hand inventory of finished goods and its depletion. Other, more advanced approaches consider finished goods inventory replenishment as well, but ignore component inventory replenishment and capacity constraints. There are numerous limitations to these approaches. First, all replenishment decisions are taken only at the beginning of the plan, rather than through-out the planning horizon. Second, inventory is not allowed to be carried over from one time period to another. Third, limitations are imposed on the form of the demand model. For example, the demand is assumed to be a linear function of the price and cross-item effects are ignored. Thus the ideal solution should consider the price selection and inventory allocation problems simultaneously in the objective function, together with a supply chain model, which may include component replenishment, inventory carryover, and capacity constraints, and an accurate demand model.

Each industry's price optimization and supply chain has a unique set of challenges. In the manufacturing sector, the predominant focus has been on minimizing cost. Essentially, cost is a driving factor for many of manufacturing-related decisions. Price optimization solutions including asset allocation have not been considered in the manufacturing domain.

BRIEF SUMMARY OF THE INVENTION

In accordance with an embodiment of the invention, systems and methods for simultaneous price optimization and asset allocation to maximize manufacturing profits are provided. In one embodiment, a set of price points for the item are determined along with a set of expected demand values for each price point for the item. Various constraints are also determined. A supply-side constraint which models time-phased inventories, their replenishment, and capacities associated with replenishment is determined. A joining constraint is determined. The joining constraint requires that the set of expected demand values be equal to a planned supply of the item. A demand-side constraint is also determined. Moreover, an objective function to maximize profits based on the set of price points for the item, the set of expected demand values for the item, and subject to the supply-side constraint, the joining constraint, and the demand-side constraint is determined. Finally, an optimal price profile for the item based on the objective function is provided.

In another embodiment, other outputs are provided by a solver, based on the objective function, such as optimal profits over a plan horizon for the item, optimal revenue for the item, optimal satisfied demand for the item, optimal demand-side costs and supply-side costs for the item, optimal quantity of replenishment supplies associated with the item, optimal inventory allocations for the item, optimal resource capacity consumption for the item, and optimal material capacity consumption for the item.

One objective is to arrive at an asset allocation in a supply-chain and a price of an item that simultaneously satisfy supply-side constraints and maximize profit. In a capacity constrained scenario, the system identifies items that have demands that are to be met preferentially over other items, so as to maximize profit while respecting the supply and demand-side constraints.

In one embodiment, price points are generated for an item. A demand model forecasts the demand points of an item at each of those price points using demand and price history. A supply-chain model determines supply-side constants, variables, costs, capacities, and constraints. The variables and constants may be used later, to determine supply-side constraints on an optimization objective function. The capacities and costs may be used to generate costs. Demand and Supply-side metrics are generated using the demand points, price points, costs, and profit and revenue formulae. These demand and supply-side metrics may be used by a solver to determine an optimal solution. Optimization constraints are generated for both the supply-side as well as the demand-side. An optimization engine determines the following outputs: optimal price points, among the set of possible time-phased price points, the optimal demand, among the set of possible demands for each price point, the optimal revenues, the optimal profits for the selected planning horizon, optimal demand-side costs for the item, optimal supply-side costs for the item, optimal replenishment of supplies to make the end items and components, optimal inventory allocations for end items and their components, and the optimal resource and material capacity consumptions. In one embodiment, the optimal solution is a selection of a single value for each of the preceding dimensions of supply, price, and demand for each time phase.

A further understanding of the nature and the advantages of the inventions disclosed herein may be realized by reference to the remaining portions of the specification and the attached drawings.

BRIEF DESCRIPTION OF THE DRAWINGS

The invention may best be understood by reference to the following description taken in conjunction with the accompanying drawings in which.

DETAILED DESCRIPTION OF THE INVENTION

In one embodiment, the optimization system and methods described herein enables manufacturing planners to simultaneously determine optimal prices for products and plan optimal allocation and replenishment of finished goods and component inventory to maximize profit. In one embodiment, price optimization over a plan horizon includes the process of optimizing the following: price, planned inventory, capacity allocation, and planned replenishment (production, purchase and transfer orders) through price/demand forecasting and cost minimization. One goal of price optimization is to maximize revenues and/or profits which can be achieved through forecasting and optimization algorithms incorporated in high-performance decision support systems. Given a price points rule model, demand model, and supply chain model, the overall profit is maximized. Optimal time-phased prices of finished goods are determined simultaneously with optimal time-phased allocation of the finished goods, component inventory, and the associated replenishment quantities of finished goods and component parts. In one embodiment, a simultaneous determination is made by modeling price and supply-side components together, within a single objective function subject to supply and demand-side constraints.

In one embodiment, the manufacturer may then use the optimal solution generated by the model by making changes to any one or more of the pricing of the item and/or component, what item and/or component to produce, how much to produce of that item and/or component, when to produce that item and/or component. Moreover, manufacturers may change which items and/or components to buy, when to buy, how much to buy, which marketing instrument to use, etc according to the output of the model. Furthermore, manufacturers may modify which items/components to transfer between facilities, how much to transfer and when to do so, based on these outputs generated by the model.

In the description that follows, the present invention will be described with reference to embodiments of subsystems on a platform for a software application, such as a database application. However, embodiments are not limited to any particular architecture, environment, application, or implementation. For example, although embodiments will be described in reference to database applications, the invention may be advantageously applied to any software application. Therefore, the description of the embodiments that follows is for purposes of illustration and not limitation.

Figure 1:
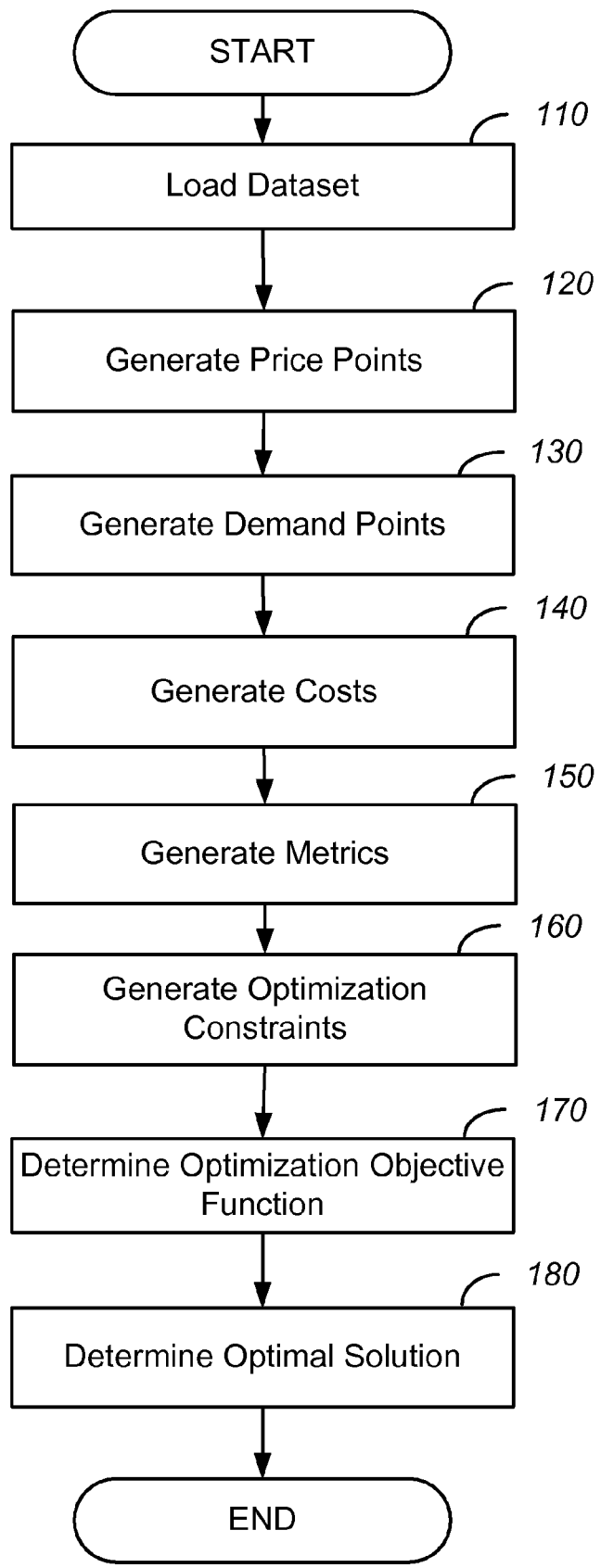
FIG. 1 is an exemplary process flow diagram which illustrates one method of price optimization.

FIG. 1 is an exemplary process flow diagram which illustrates one method of price optimization. In manufacturing processes, a manufacturer has product lines available for sale to customers as part of its business plan. The manufacturer desires to optimize pricing for multiple product lines and end items, account for price elasticity of demand, uncertainty in demand, minimize cost associated with asset allocation and replenishment, and adjust its strategic business plan in order to maximize profits. While the present discussion will center on manufacturers, the optimization systems and methods described herein are applicable to other enterprises and businesses having similar goals, constraints, and needs.

The simultaneous price optimization and asset allocation method for maximizing profit is represented as a mathematical model to determine the optimal time-phased pricing strategy, demand strategy, and supply-chain strategy for each item and/or node of a product hierarchy. The mathematical model consists of an objective function subject to constraints, also referred to herein as an optimization objective function. The objective function is formulated as a maximization of revenue minus cost, which may also be stated as price minus cost multiplied by the portion of the demand which is satisfied or chosen to be satisfied for a given end item. Thus, price points of an item, own demand for the item, cross demand for the item, and the associated costs for the item are determined. In one embodiment, the model also makes decisions for a manufacturer including what to produce, how much to produce, when to produce for each item as well as for component parts. Moreover, items and/or components to buy, when to buy, how much to buy, which marketing instrument to use, etc. are decided. Similarly, the model also calculates which items/components to transfer between facilities, how much to transfer and when to do so. In one embodiment, these decisions may be made for any level of product hierarchy.

At step 110, a sourced dataset is loaded and/or selected. In one embodiment, the dataset is received from a data storage system, such as a database. The data received includes a linearized demand model specification including uncertainty in the demand. Moreover, demand-side entities are provided, including the items, such as end items (e.g. finished goods) and/or their component parts as well as the associated historical demands. In one embodiment, the item entities are represented in hierarchical form, such as a graphical tree which uses graphical elements, such as rectangles, within a graphical layout area. The graphical tree may depict the end items as root nodes, component parts as child nodes, and elementary parts (e.g., smallest components) as leaf nodes. The input dataset may also include demand-side business rules such as constraints on margin, revenue, cross item business rules, etc, demand-side costs, such as price change and promotion costs. Also, supply-side entities and relationships are provided such as the supply-chain network model, including item-organization-time bucket entities, sources, bill of materials including substitute components, resources, capacities, etc. The supply-side entities may further include supply-side constraints, such as material balance equations and slack variables to model capacity violations. Supply-side costs per item-organization-time bucket are provided such as production, transportation, purchasing, and carrying costs. Materials, resource and transport capacities that are available are provided, as well as penalty costs for alternates and capacity violations. Profit and revenue formulae may be provided as inputs to the objective function. Additional joining constraints between the demand and supply models may also be loaded and/or selected, such as a price/demand selection constraint. In one embodiment, the joining constraints are determined using the demand-side entities and relationships, supply-side entities and relationships, price points, demands, costs, and metrics.

Price Point Rule Model

At step 120, all possible price points for one or more items and/or nodes within the product hierarchy are generated. Nodes within the product hierarchy may include end items, component parts, product families, etc. Price points are generated for all nodes for which external demand is anticipated. The generated price points are based on the price profile rules and demand-side entities and relationships. In one embodiment, a set of price points which satisfy the demand-side entities and relationships are generated for each item and/or nodes within the product hierarchy. For example, price points are generated for a maximum range of (Base Price, 0) and a minimum range of (Minimum Discount*Base Price, Maximum Discount*Base Price). As described herein, the price points are treated as variables, rather than fixed values, for the objective function.

The price profile rules ensure the generated price points for an item satisfy certain defined pricing relationships and strategies. For any level in the product hierarchy, price profile rules can include margin, price movement, competitor prices, associated product, incentive schemes such as price discount, dollar off, multiple buys, volume discounts, ending number rules, etc. For example, a price profile rule may require that a price end with $0.99 or $0.95. A price relationship between different end items or nodes within the product hierarchy may also be defined in a price profile.

Demand lift uncertainty describes the uncertainty in the predicted demand values for a chosen price point, as well as the variation of this uncertainty over time. Predictions made for remote time phases result in diminishing precision. To account for demand lift uncertainty, a planner may select a level of demand lift confidence and a corresponding quantity Q of the item. The effect of demand lift uncertainty in the demand at a given price can be captured by assuming that the demand response for a given price point lies in a determinate set of values. For example, if the price for item "i" is set at "p" at time "t," the demand could take on one of three values, Q={Q1, Q2, Q3}. These quantities could correspond to the planner's confidence level in the demand lift that a price will generate. The quantity Q1 may correspond to a pessimistic confidence level, Q2 may correspond to a nominal confidence level, and Q3 may correspond to an optimistic confidence level as set by the planner. At a future time "t2", the range in the value set Q={Q1, Q2, Q3} may be larger than at time "t." In one embodiment, policy requires the user to select a single value out of the set Q for a given item at a given time. Thus the user can model pessimistic or optimistic scenarios in a time-varying manner.

Demand Model

At step 130, all possible demand points are generated for each price point. In one embodiment, multiple possible demand points are generated for each associated price point. Essentially, demand is a function of price, where the prices may be everyday low, promotional, or markdown prices. The nature of the function is non-linear, stochastic, and correlated. The demand model is based on a baseline demand of the item in quantity terms, price elasticity of the item, cross effects from other products, and cross effects from other marketing instruments.

For purposes of illustration, exemplary mathematical formulae will be provided below. These examples are not intended to limit the scope of the present invention since other formulae may also be used within the scope of the present invention. In one embodiment, the demand model may be represented as the following:

$$Q_x = Q_{0x} \cdot (P_{ex}/P_{bx})^{-\beta_x} \cdot \prod_p \left( \prod_y (P_{ey}/P_{by}) \right)^{\beta_x^p} \left( \prod_i \exp(\gamma_{ia} I\{M_i\}) \right), \quad (1)$$

$\{x, y\} \in p$ where
$Q_x$=the sales volume (total demand) of item x
$Q_{0x}$=baseline demand of x $P_{ex}$=Effective Price of x
$P_{bx}$=Base/List Price of x
$P_x=P_{ex}/P_{bx}$=(Effective Price x)/(List Price x) is the price ratio of x
$\beta_x$=own-price elasticity of x
$P_y=(P_{ey}/P_{by})$=(Effective Price y)/(List Price y) is the price ratio of a cross-impacting (y) within a pool (p)
$\beta_x^p$=cross-price elasticity of pool (p) upon x (either cannibalization or affinity/halo effect)
$\gamma_{ia}$=coefficient of marketing instrument i for item a
$I\{M_i\}$=indicator variable for existence of marketing instrument i The demand model is stochastic because a given price on a product can result in multiple demand points. Demand is also similarly correlated to cross product prices. Moreover, the model is multiplicative and exponential, and thus non-linear in nature to represent the price elasticities and the effects of components upon each other. The demand model forecasts the demand points of an item at each price point using demand and price history.

In this model, $Q_{ox}$ represents the baseline quantity of item X. The baseline quantity is an exogenous variable, measured by the demand due to trend, such as seasonality. The price ratio is determined by the effective price of item X divided by the base or list price of item X. In one embodiment, the base price is a reference price, such as manufacturer suggested retail price (MSRP) in the case of promotions pricing. In another embodiment, the base price is a time-weighted average of varying prices in the case where a clear estimate of the reference price is unknown. The effective price is the selling price of the item for a particular point in time. The ratio of the effective price to the base price is used for normalization, instead of absolute numbers. The price ratio is raised to the power of the item X's own price elasticity, which is represented by $\beta_x$. Elasticity is usually represented as a negative number. The $\Pi$ terms represent cross effects from the price of correlated items and the effects of marketing instruments.

The first $\Pi$ term represents the cross effects from price. The quantity of demand for item X is affected by the price of item Y. The price ratio of the cross product Y is determined by the effective price of item Y to the base or list price of item Y. In one embodiment, the cross product price ratio is raised to the power of $\beta_x^y$, representing the price elasticity of item X based on a change in price of item Y. In another embodiment, the cross product price ratio is raised to the power of $\beta_x^p$, representing the price elasticity of item X based on a change in prices of a pool (p) of items including item Y. The pool is a grouping of a set of items. The Beta coefficients for the pool of items is found by first generating a union of each of the histories of the individual items in the pool. This generates a cloud of points. Second, this cloud of points is used as the input set of data points that drives the determination of the beta coefficients for the pool. Multivariate linear or non-linear regression methods may be used to determine these coefficients. Once the Beta coefficients for the pool have been obtained, they can be used to determine demands at the individual item level. Because the individual item's observations have also been included in the cloud of points, the coefficients include the item's behavior. For example, item X is a 5 oz. Coke bottle and item Y is a 5 oz. Pepsi bottle. The influence of the Pepsi price on the demand of the Coke can be measured either at the specific item level or using a Pepsi pool. More specifically, the cross elasticity of a pool consisting of a 5 oz. Pepsi, a 10 oz. Pepsi, and a 12. oz Pepsi is used as the Beta coefficient, rather than that of the individual item (5 oz. Pepsi). Of course the Beta coefficients of the individual items may be used instead of the pool if that data is readily available.

Computing the Beta values using the pool coefficients allows the cross elasticity to be represented with a reasonable amount of data, reducing the computational challenge of the demand model. Moreover, the pool coefficients may be used where the cross effects are known for high levels of the item hierarchy, such as brand level, rather than lower levels of hierarchy, such as item size. In one embodiment, the pools taken into account are those that map the cross-impacting price y to item x. It should also be noted that pooling can also be applied to the beta coefficient of the own demand, which is represented by $\beta_x$. For example, the $\beta_x$ which represented 5 oz. Coke price elasticity may be replaced by the beta coefficient of a Coke pool (e.g. 5 oz. Coke, a 10 oz. Coke, and a 12. oz Coke).

The cross price elasticity, $\beta_x^y$ or $\beta_x^p$, of item X may represent either cannibalization or the affinity/halo effect (negative and positive correlation, respectively). Cannibalization refers to the reduction in demand of an item, such as item X, as a result of an increase in demand of another item, such as item Y. Essentially, consumers switch from one item to another. The halo effect refers to an increase in demand of an item, such as item X, in response to a decrease in price (and accompanying increase in demand) of the other item. For example, where item X is a TV stand and item Y is a TV, if the TV experiences a reduction in price, and a corresponding increase in demand, the demand for TV stands will increase. Thus, for both cannibalization and the halo effect, the price of one item, such as item X, is a function of the price of another item, such as item Y.

A second $\Pi$ term represents the effects from marketing instruments, such as in-store displays. The quantity of demand for item X is affected by a marketing instrument. In one embodiment, the coefficient of marketing instrument i for item A may be represented by $\gamma_{ia}$. the marketing instrument may affect the demand of item X based on its presence or absence. As such, an indicator variable may be used to indicate the presence or absence. In one embodiment, indicator variables may be implemented as integer variables in the solver. For example, indicator variable $I\{Mi\}$ of the marketing instrument i may have a value of 1 indicating the presence of the instrument i and may have an integer value of 0 indicating the absence of the instrument i. In one embodiment, price is the sole marketing instrument. In alternative embodiments, the demand model may be extended to derive optimal values and timings of several marketing instruments $M_i$ by including the marketing instruments as additional decision variables.

Equation (1) above represents the non-linear demand model. The demand model is used to determine a forecast of demand points for each price point. Before the demand points can be generated, the demand model is linearized in order to be solvable by a linear solver, such as a mixed integer linear programming (MILP) solver. The linearization consists of the following five steps: (1) Collect historical price/demand data; (2) Transform the nonlinear market response model (MRM), Equation (1) above, to a logarithmic linear form; such as:

$$\ln Q_x = \ln Q_{0x} - \beta_x \ln(P_{ex}/P_{bx}) + \beta_x^{p1} \ln(P_{ey1}/P_{by1}) + \ldots + \gamma_{ia} I\{M_i\} + \ldots;$$

(3) Perform MLR (multivariate linear regression) on the price/demand data to fit the price/demand data into a linear MRM transform, in order to determine the elasticity coefficients beta and the baseline demand; (4) Plug in the beta values and baseline demand back into Equation (1); and (5) Perform a two-step linear approximation of the MRM, for example, by taking the Taylor's first-order approximation and a pairwise interaction assumption. This transformation generates a linear demand model. The five-step method for linear approximation of the MRM is described in further detail in Appendix B. Other methods of linearizing the demand model may also be used without departing from the scope of the invention.

In one embodiment, the Beta coefficients are validated as complying with Beta coefficient rules. Essentially, the beta coefficient rules may be specified in order to more accurately model a real world problem. The Beta coefficient rules may be specified where the user has pre-existing knowledge of the relationship between the independent variables and the dependent variable. For example, one rule may require a beta coefficient to be negative in value.

The regression Beta coefficients are used to generate the predicted demand points. A calculation of the demand using the linear demand model and the Beta coefficients is performed. For example, for each price point determined at step 120 and for each future time phase, the predicted demand is generated. Thus, after determining the beta coefficients using regression, two levels of approximation are performed to arrive at a linear model for generating the demand points: the first is a Taylor series first order approximation and the second is a pairwise interaction approximation. These result in a linear demand model, consisting of the sum of an own demand and a cross demand.

In addition to the price points, costs, metrics and constraints, the generated demand points will be used to determine the optimization objective function, which will be discussed in further detail with regard to step 170.

Supply-Chain Model

In one embodiment, the supply-chain model is included in the optimization objective function. Supply-side constants, variables, costs, capacities, and constraints are determined from the supply-chain model data The variables may be used later, in step 160, to determine supply-side constraints on the optimization objective function. The capacities and costs may be used to generate costs at step 140. Variable time buckets may be selected to choose a planning horizon. Time buckets may be selected for various levels of time granularity, such as weekly and period buckets. The time buckets may be selected by a user, for example, using a graphical user interface. The supply chain model uses the forecasted independent demands, which may be specified for end items and/or component parts. In another embodiment, demand priorities may be incorporated into the supply chain model.

The supply-chain may model multiple organizations and may represent both organizations internal to the supply chain and supplies from external vendors. As used herein, organizations are denoted with index (g) in the formulation and vendors are denoted with an index (v). The model thus plans for each item at each organization that the item is present in, at each time bucket within the chosen plan horizon.

Operation yield may be modeled. For example, the manufacturer produces item A from item B, with a usage of one and a yield of 90%. Ideally, 100 units of A requires 100 units of B. However, the operation is not fully efficient, producing only ninety units of item A for every 100 units of item B. In one embodiment, the operation yield is a supply-side entity which translates demands into supply requirements.

Product families may be modeled similarly to items, but with a few distinguishing features regarding pegging when supply and demand occur at different levels (i.e. one occurs at the item level but the other at the product family level). If demand for an item i occurs at an item level and the supply at a product family level, the assumption is that any member of product family to which i belongs can be pegged to demand of i. This may occur in the case of independent demand, since supply for dependent demand is not allowed to be late. Independent demand refers to external demand, which is the demand originating outside the business entity being modeled. The independent demand or external demand may be placed on end items or components, as distinct from dependent demand, which is a derived demand placed on components due to independent demand on their parent items. The origins of dependent demand are thus internal. If demand is at a product family level and the supply at an item level, the assumption again is that supply from any member of the demand's product family can be pegged to the demand.

On-hand and existing supply may also be included into the supply chain model. On-hand quantity is defined at the item level. If there is a product family demand for which on-hand supply is available, on-hand supply of items will be allocated to product family demand. Scheduled receipts may be included in the model. Various types of existing supply may be considered, including: purchase orders, purchase requisition, purchase order-in-receiving, and in-transit shipments and receipts. Purchase orders are modeled as supply from a vendor to an organization. The purchase orders are associated with a quantity of an item and a due date. The quantity is used to update a projected available for each time bucket in which the due date falls. Moreover, the quantity is used to decrement the vendor capacity and the transportation capacity in the appropriate time buckets. In one embodiment, the projected available quantity for item i within an organization and time bucket (based on the purchase order quantity) is used to determine an inventory carrying cost, in the objective function. The projected available quantity may also be used as a supply-side constraint.

Purchase requisitions are modeled as supply to an organization. If vendor information is available on the purchase requisition, the purchase requisition quantity is decremented from the vendor capacity and added to the projected available in the organization in the appropriate time buckets. If vendor information is not available, the purchase requisition quantity is added to the projected available in the organization in the appropriate time bucket, without updating any vendor capacity.

Purchase orders-in-receiving are modeled as supply from a vendor to an organization. The quantity is used to update the projected available equation in the appropriate time bucket. However, transportation capacity and vendor capacity may not be updated.

In-transit shipments and receipts are modeled as supply from one organization to another. The in-transit quantity is used to update the projected available equation in the appropriate time bucket. However, transportation capacity and vendor capacity may not be updated.

In one embodiment, the supply-chain model considers replenishment supply. For example, replenishment may include purchased supply from a vendor, which may be represented by a supply-side variable XVITC. In one embodiment, replenishment supply may also include transported supply from a sister organization, which may be represented by a variable XUITC, and may also include the total quantity produced by a process for the production of an item, which may be represented by a variable TQPIP.

Sourcing ranks may be incorporated in the formulation through an objective. The rank will be used as a tie-breaker in the case where item cost is the same in multiple sources and capacity is available in multiple sources. For example, the manufacturer may purchase an item A from a supplier or may transport the item A as an inter-organization transfer, such as from a sister organization owned by the manufacturer. A percentage of items which are purchased and items which are transported may be specified where the cost of the item is the same across various sources. For example, where item A is available from various sources, it may be specified that 60% of the item A will be acquired by transport and 40% will be acquired by purchase. Although source ranks has been considered in the context of Supply-Chain Optimization, prior art methods have required prices to be fixed inputs, with known demands and known costs. As taught herein, prices are treated as variables across the entire optimization objective function.

At step 140, costs are generated. In one embodiment, various cost terms are modeled in the profit optimization function. The cost terms are denoted in equation (2) as $C_{i,g,t}$. For incoming customer demands of an item, supplies should be created to match those incoming demands. A cost term may minimize demand lateness in an order of priority. In one embodiment, lateness is measured by a cost of late demand and a cost of unmet demand. A cost of late demand is determined where a manufacturer fulfills the demand within a threshold number of time units past a due date, as set forth below:

$$\sum_d PCD_d * \sum_{t>t(d)} (t - t(d)) * XFIDQ_{i,g,d,t} +$$

$$\sum_d PCU_d * \sum_{t>t(d)} (t - t(d)) * SIDQ_{,d}$$

$i = i(d)$

To determine the cost of late demand, a variable is associated for each time bucket representing the material flow or the supply towards the demand, such as the variable XFIDQ. The variable is multiplied by a penalty cost of the late demand, such as PCD. Moreover, lateness may be measured by a cost of unmet demand, which is the demand that the manufacturer is unable to satisfy. The cost of unmet demand may be determined by a measure of the unmet demand quantity for every time bucket which is late multiplied by a penalty cost for the unmet demand, as set forth below:

$$\sum_d PCD_d * \sum_{t>t(d)} (t - t(d)) * XFIDQ_{i,g,d,t} +$$

$$\sum_d PCU_d * \sum_{t>t(d)} (t - t(d)) * SIDQ_{,d}$$

$i = i(d)$

For this embodiment, the unmet demand quantity is represented by the variable SIDQ and the corresponding penalty is represented by the constant PCU. Essentially, the penalties force the demand lateness to be minimized. By enforcing costs as a part the optimization objective function, the optimized price, as selected by a solver, is determined by the cost of lateness, among other features.

In one embodiment, cost terms may include demand-side costs. In one embodiment, demand-side costs are costs associated with a change in the price of an item. More specifically, a cost is incurred for every instance a new price point is selected. The price costs may be calculated by multiplying the penalty cost of changing the price by the own demand and by the cross demand, as set forth below:

$$\sum_{i,g=1}^{N_d} \sum_{t=1}^{N_t} \left\{ \sum_{j=1}^{Np_i} C_{V_{i,g}} \cdot QO_{i,g,t}^j \cdot \right. \quad (6)$$

$$\left. xp_{i,g,t}^j + \sum_{j=1}^{Np_i} \sum_{k=1}^{N_{cri}} \sum_{l=1}^{Np_k} C_{V_{i,g}} \cdot QC_{i,g,t,k}^{j,l} \cdot (p_{i,g,t}^j) \cdot xp_{i,g,t}^j \cdot xp_{k,h,t}^l \right\}$$

The bilinear constraint in equation (6) may be linearized as outlined in Appendix A prior to determining the optimization objective function in step 170. Where marketing instruments are modeled, the costs incurred by marketing instruments can be modeled in a similar manner.

Item costs for production of an item and/or for the purchasing of the item may be determined. Item costs may be determined by multiplying the quantity of the independent demand that is satisfied (i.e. the supply) by the item per unit cost. The item costs due to production are determined by the total quantity produced (TQPIP) multiplied by the processing cost of the item, as set forth below:

$$\sum_w TQPIP_w * CSTW_{i,w} + \sum_{v,g,t,i} \sum_c XVITC_{i,c,v,g,t} * CSTV_{i,v}$$
$$\scriptstyle i=i(w)$$

The item costs due to purchasing are determined by the quantity of units of the item purchased from or transported from a vendor (XVITC) multiplied by the cost of the item which was supplied by the vendor, as set forth below:

$$\sum_w TQPIP_w * CSTW_{i,w} + \sum_{v,g,t,i} \sum_c XVITC_{i,c,v,g,t} * CSTV_{i,v}$$
$$\scriptstyle i=i(w)$$

Inventory carrying cost is a holding cost and may be included as a cost term. The inventory carrying costs may include other costs, such as opportunity costs, costs for insurance, cost for rent, etc. The carrying cost is directly proportional to the length of time the stock of an item is held and may be calculated by multiplying the average inventory level in a time bucket by the carrying costs in that time bucket and then summing the value across all items and all time buckets, as set forth below:

$$\sum_{i,g,t} \frac{(XPA_{i,g,t} + XPA_{i,g,t-1})}{2} * h_g * CSTG_{i,g}$$

$t \geq 1$

In this embodiment, the average inventory level available for a bucket is multiplied by a interest rate or a carrying cost percentage 'h' and by the standard cost of the item. Two types of transportation costs may be represented, a cost for inter-organization transfers and a transportation cost for items purchased outside of the organization, as set forth below:

$$\left( \sum_{i,g,g'} \sum_{c,t} XUITC_{i,c,g,g',t} * CPC_{g,g',c} \right) + \left( \sum_{i,v,g} \sum_{c,t} XVITC_{i,c,v,g,t} * CPC_{c,v,g} \right)$$

The transportation costs are calculated by multiplying the quantity transported (XUITC for inter-organizational transfers and XVITC for transfers from external vendors) by the shipment cost per unit transported for each time bucket, as set forth below:

$$\left(\sum_{i,g,g'}\sum_{c,t} XUITC_{i,c,g,g',t} * CPC_{g,g',c}\right) + \left(\sum_{i,v,g}\sum_{c,t} XVITC_{i,c,v,g,t} * CPC_{c,v,g}\right)$$

In one embodiment, overuse costs are handled using the concept of slack variables. This technique assigns penalties dependant on one or both of the priority of the constraint being violated and the size of the limit violation. Generally speaking, slack variables are defined as the value or magnitude by which the predicted process variable exceeds (is above or below) the limit being violated. The optimizer uses the objective function to minimize the slack variable and thereby minimize the limit violation in conjunction with the other objectives defined by the objective function. The same or a different penalty may be defined for each of the slack variables. The objective function includes slack variables that defines a cost or a penalty resulting from each limit violation for each variable that violates an associated limit.

Implicit penalty costs may also be modeled. In one embodiment, a penalty cost for supplier capacity violation is enforced. The cost for supplier capacity violation is calculated by multiplying the penalty cost for exceeding vendor supply capacity by a supplier capacity slack variable of the quantity exceeded, as set forth below:

$$\sum_{i,v,g,t} PCSO_{i,v,g} * SESQ_{i,v,g,t}$$

Penalty cost for resource capacity violation may be enforced. The resource capacity is represented in terms of production line capacity for an item and for each time bucket. The cost is calculated by multiplying the penalty cost for exceeding resource capacity by a resource capacity slack variable of the quantity exceeded, as set forth below:

$$\sum_{r,t,g} PCRO_{r,g} * SRACL_{r,t,g}$$

Penalty cost for safety stock violation may be enforced. Safety stock is a buffer or a quantity of net available inventory the manufacturer wants to hold at any time for an item. In one embodiment, the safety stock quantity is determined by a user. In one embodiment, safety stock may be specified where demand is uncertain. The safety stock violation is calculated by multiplying the penalty cost for safety stock violation by a slack variable of the shortfall in safety stock quantity, as set forth below:

$$\sum_{i,g,t} PCSS_{i,g} * SSSQ_{i,g,t}$$

Penalty cost for unmet demand may be enforced using a slack variable. For example, if the demand for an item exceeds capacity at which a manufacturer can supply the item, cost for the unmet demand is calculated by multiplying the penalty for the unmet demand by the slack variable for the quantity of unmet demand, as set forth below:

$$\sum_d PCU_d * \sum_{t>t(d)} (t - t(d)) * SIDQ_d$$

Penalty cost for transportation capacity violation may be enforced. Each carrier is associated with a capacity at which items may be transported within a time bucket. If the demand for an item (and thus the required supply) exceeds the transportation capacity, cost for capacity violation is calculated, as set forth below:

$$\sum_{c,g,g',t} PWTC_{c,g,g'} * SWTC_{c,g,g',t} + \sum_{c,g,g',t} PVTC_{c,g,g'} * SVTC_{c,g,g',t} + \sum_{c,v,g,t} PWTC_{c,v,g} * SWTC_{c,v,g,t} + \sum_{c,v,g,t} PVTC_{c,v,g} * SVTC_{c,v,g,t}$$

Penalty cost for unmet scheduled receipts, may be enforced. In one embodiment, the cost for unmet scheduled receipts is calculated by multiplying a slack variable for the quantity of the scheduled receipt that is unmet (e.g., pushed out to the end of the horizon) by the penalty cost for unmet scheduled receipts.

A penalty cost for distribution center capacity violation may be enforced. Distribution center capacities may be modeled in the supply-chain model using a constraint to ensure a projected available in each time bucket does not exceed the distribution center capacity. The penalty is calculated by multiplying the penalty cost for exceeding distribution center capacity by a slack variable for the capacity exceeded, as set forth below:

$$\sum_{g,t} PDCC_g * SDCC_{g,t}$$

Furthermore, a penalty cost for using an alternate resource may be enforced. The use of an alternate resource may be modeled in the supply-chain model. An alternate resource as used herein is a machine or device used to produce, directly or indirectly, the end item or component. Building a product using different resources may alter the cost computation. Accordingly, alternate resources are modeled to account for the varying costs. A primary resource may be used where available. Otherwise, alternate resources are used in order of priority.

Penalty cost for using substitute items may be enforced. Substitute components may be modeled in the supply-chain similarly to that of alternate resources. In one embodiment, components listed within a primary BOM are associated with a set of possible substitutes. Item preferences (e.g., the primary item should be used instead of the substitute if the primary item is available) are enforced by the penalty costs. All things being equal, the primary item should be used before the substitute items are used. In one embodiment, the cost for using a substitute item is determined by penalty by the cost of the substitute item.

Moreover, a penalty cost may be enforced for using an alternate bill of materials (BOM) and/or alternate routing. Alternate BOM and/or alternate routing may be modeled through an objective. For example, end item A may be comprised of component parts B and C. Alternatively, end item may be comprised of component parts B and D. Building a product using different resources or components may alter the cost computation. Accordingly, alternative BOMs are modeled to account for the varying costs. A primary BOM may be used where the resources and components are available. Otherwise, alternate BOMs and routings are used in order of priority.

Penalty cost for using alternate sources may be enforced. Where multiple sources are available for the supply of an item, the use of a non-primary source may incur a cost. Sources may include, for example, a supplier or an inter-organization entity.

Moreover, demand-side costs are determined. For example, costs associated with running marketing instruments are determined based on which marketing instruments are used. Each marketing instrument may be associated with a cost. Moreover, supply-side costs may also be determined along with cost drivers. Various other demand-side costs may be determined.

At step 150, metrics are generated to monitor both supply and demand-side performance. Generally, supply-chain optimization may include developing and tracking a set of metrics to monitor the supply chain for efficiency. Supply Chain measurements metrics such as costs, incremental costs, Inventory Turns, Cycle Time, and Fill Rate are used to track Supply Chain performance over a time bucket and can cover many areas including Procurement, Production, Distribution, Warehousing, Inventory, Transportation and Customer Service. Demand-based metrics may also be determined, for example, profit margin and incremental profit margin. Thus, in one embodiment, both demand and supply-side metrics are determined. The metrics are generated using the demand points, price points, costs from step 140, and profit and revenue formulae. Various other demand and supply-based metrics may be generated. These demand and supply-side metrics may be used by a solver to determine an optimal solution. The optimal solution will be described in further detail with regard to step 180.

At step 160, optimization constraints are generated for both supply-side constraints as well as demand-side constraints. The objective function is then solved subject to both of these supply and demand constraints. Optimization constraints may be generated using the input values for supply and demand business rules, demand-side entities and relationships, supply-side entities and relationships, and metrics.

Supply and demand-side constants and variables are entities which may be located in supply-side entities and relationships repository 240 and demand-side entities and relationships repository 204. The relationships are embodied as the generated constraints. An exemplary list of demand-side constants and variables is provided in Table A. An exemplary list of supply-side constants is provided in Table B. An exemplary list of supply-side variables is provided in Table C. Supply-side constraints may include the following:

1. Price/Demand Selection (Joining Constraint)

$$\sum_{j=1}^{N_{pi}} (QO_{i,g,t}^{j}) \cdot xp_{i,g,t}^{j} + \sum_{l=1}^{N_{pk}} (QC_{i,g,t_k}^{j,l}) \cdot xp_{i,g,t}^{j} \cdot xp_{k,h,t}^{l} = XIDQ_d$$

$$\forall\, i.g.t$$

The price/demand selection constraint effectively links together the pricing-side and the supply-side of optimizations. Thus, this may be considered either a supply-side or demand-side constraint. All combinations of possible price points and quantities of demand (own demand as well as cross demand) are considered for each item and for each time bucket by the solver. The solver will select an independent demand by selecting a single price point and corresponding demand for a single time bucket.

In general, the pricing optimization in manufacturing fails to consider supply-side-modeling. In this embodiment, the price/demand selection constraint uniquely combines both the pricing aspects and supply aspects. As shown, one side of the equality represents the pricing aspects, such as own demand and cross demand (e.g., the set of expected demand values). The other side of the equality represents the supply aspects, such as planned supply of the item, or the total selected demand that the supply-side will meet. A selected/satisfied independent demand is an output of the optimal solution and is the demand selected from the set of demand values generated at step 130 and is satisfied by the optimal solution. It is the demand value which is found to be optimal to satisfy during the optimization. It maximizes profit subject to all the constraints. As will be shown, the selected independent demand (XIDQ) is propagated through-out the supply-side. Thus, the price/demand selection constraint exemplifies the simultaneous nature of the method for price and asset allocation.

2. Fulfill Independent Demand

The sum of (1) total supply allocated to independent demand (XFIDQ), and (2) unfulfilled demand (SIDQ) is equal to the total selected independent demand (XIDQ). This includes planning at the item level as well as at the product family level.

$$\sum_{\substack{t \\ i=i(d), g=g(d)}} XFIDQ_{i,g,d,t} + SIDQ_d = XIDQ_d$$

$$\forall\, d$$

In order to focus on the effect of price variations on allocations, allow capacity overloads and assume that there is no unfulfilled demand i.e. SIDQ=0 and $$\sum_{\substack{t \\ i=i(d), g=g(d)}} XFIDQ_{i,g,d,t} = XIDQ_d$$

The fulfill independent demand constraint requires the selected independent demand to be satisfied by a net supply. A portion of the demand may not be met as indicated by the slack variable SIDQ. The supply may also be late, as indicated by the variable XFIDQ. For example, the optimizer may see the demand of two items, each item having a different profit margin. The optimizer selects the optimal pricing, which determines the demand for each item. The amount of the demand which is then optimally satisfied for each item may be determined based on the costs, overall profit, and constraints. For example, some of the demand for item A may go unmet, whereas the demand for item B is completely fulfilled.

3. Projected Available

Projected available quantity at the end of time t is equal to the sum of (1) projected available at the end of time (t−1) and (2) difference between supply and demand in time t.

$$XPA_{i,g,t} = XPA_{i,g,t-1} + \sum_{w \atop i(w)=i, g(w)=g, t(w)=t} TQPIP_w + \sum_{v} \sum_{c} XVITC_{i,c,v,g,t} +$$

$$\sum_{g'} \sum_{c} XUITC_{i,c,g',g,t} - \sum_{d \atop g(d)=g, i(d)=i} XFIDQ_{i,g,d,t} -$$

$$\sum_{i' \atop t(w)=t+OEDBEP_p} TQCO_{i,w,i'} - \sum_{g'} \sum_{c} XUITC_{i,c,g,g',t' \atop t'=t+OEDT_{c,g,g'}}$$

$\forall i, g, t, 1$ $t > 1$

Note:
positive terms=supply.
negative terms=demand.
i denotes (i) an item during the time buckets in which planning is at an item level, and (ii) a product family during the time bucket in which planning is at a product family level.
For the first time bucket when planning is at a product family level $$XPA_{i,g,t-1} = \sum_{i' \atop i' \in i} XPA_{i',g,t-1}$$

i is the product family. i' is the set of items belonging to the product family. Projected available at end of time 0 (i.e. start of time 1) is equal to initial on-hand.

$XPA_{i,g,0} = OH_{i,g}$ $\forall i, g, 1$

4. Fulfill Safety Stock Requirement
The projected available in a time bucket must be greater than or equal to the safety stock quantity required in that time bucket. A safety stock slack SSSQ is modeled to enable feasibility for the case where XPA is constrained to be below XPSS. This slack is penalized in the objective function.

$XPA_{i,g,t} + SSSQ_{i,g,t} \geq XPSS_{i,g,t}$ $\forall i, g, t$

5. Supply Capacity of Vendor
The total external supply from vendor v to org g is equal to the vendor capacity. A supplier slack SESQ is modeled for the case where the XVITC requirements exceed the capacity ESQ, this slack is also penalized in the objective function.

$$\sum_{c} XVITC_{i,c,v,g,t' \atop t'=t+OEDB_{c,v,g}} \leq ESQ_{i,v,g,t} + SESQ_{i,v,g,t}$$

$\forall i, v, g, t$

6. Resource Capacity
The total units of resource used in each time bucket (XCOCRV for production and XOPH for scheduled receipts) is less than or equal to the maximum units of resource available RACL. A capacity slack SRACL is modeled for the case where the resource requirements exceed the resource availability, this slack is penalized in the objective function too. This is also applicable for production lines.

$$\sum_{w \atop t(w)=t} XCOCRV_{w,r} + \sum_{s \atop g(s)=g} XOPH_{r,s,t} \leq RACL_{r,t,g} + SRACL_{r,t,g}$$

$g = g(w), \forall r, t, g$

Assumption:
w lies in a single time bucket
7. Quantity Dependent BOM/Routing
The total quantity that can be produced with a given process is less than or equal to the maximum allowed production quantity using that process.

$TQPIP_w \leq MTQP_w$

8. Balance Demand and Supply for Materials $$\sum_{i'} \frac{1}{ISCQ_{p(w),i,i'}} TQCO_{i',w,i} = TQPIP_w$$

$\forall w, i$

Note:
TQCO is the dependent demand generated for a component due to demand and production TQPIP of its parent item
i is a possible substitute for i (i.e) $ISCQ_{p,i,i} = OCIQ_{p,i}$
9. Balance Demand and Supply for Resources $$\sum_{r'} \frac{1}{ARU_{r,p,r',g}} XCOCRV_{w,r,r'} = TQPIP_w$$

$\forall w, r, o$

Note:
ARU is resource usage per unit produced
r is a possible substitute of r (i.e) $ARU_{r,p,r,g} = OCRU_{r,p}$
$\forall i, g, t$
10. Transportation Carrier Capacity
The total transportation capacity used for a carrier in a time bucket between organization g and organization g' is less than or equal to the available capacity for the carrier in that time bucket plus a slack variable.

By weight $\sum_{i} XUITC_{i,c,g,g',t} * WT_i = WTC_{c,g,g'} - SWTC_{c,g,g',t}$ $\forall c, g, g', t$ By volume $\sum_{i} XUITC_{i,c,g,g',t} * VOL_i = VTC_{c,g,g'} - SVTC_{c,g,g',t}$ $\forall c, g, g', t$ The total transportation capacity used for a carrier in a time bucket between vendor v and org g is less than or equal to the available capacity for the carrier in that time bucket.

By weight $\sum_{i} XVITC_{i,c,v,g,t} * WT_i = WTC_{c,v,g} - SWTC_{c,v,g,t}$ $\forall c, v, g, t$ By volume $\sum_{i} XVITC_{i,c,v,g,t} * VOL_i = VTC_{c,v,g} - SVTC_{c,v,g,t}$ $\forall c, g, g', t$

11. Distribution Center Capacity

The total storage capacity used in a time bucket is less than or equal to the maximum available storage capacity in that time bucket.

$$\sum_{i} VOL_i * XPA_{i,g,t} = DCC_g - SDCC_{g,t}$$

$\forall g, t$

Demand-side Constraints May Include the Following:

1. Price Point Selection Constraint $$\sum_{j=0}^{Np_i} xp_i^j = 1, \forall \text{ product } i \cdot \forall \text{ time buckets } t$$

The above constraint ensures that only one price point can be selected from all the possible price points of a product at a given point in time

2. Quantity Constraint $$\text{Min}_q <= \sum_{j=1}^{Np_i} QO_i^j \cdot xp_i^j + \sum_{k=1}^{N_{crdi}} \sum_{j=1}^{Np_i} \sum_{l=1}^{Np_k} QC_{i,k}^{j,l} \cdot xp_i^j \cdot xp_k^l \forall \text{ product } i$$

This constraint ensures a minimum bound to the unit sales of a product. It can be at a single product level, product group level, or other node of the product hierarchy. Note that a Max constraint is not needed since it was meant to model supply constraints, which are now explicitly modeled. The bilinear above term is linearized as shown in Equation (5) of Appendix A.

3. Budget Constraint $$\text{Min}_B <= \sum_{i=1}^{N_d} \left\{ \sum_{j=1}^{Np_i} QO_i^j \cdot (p_i^1 - p_i^j) \cdot xp_i^j + \sum_{k=1}^{N_{crdi}} \sum_{j=1}^{Np_i} \sum_{l=1}^{Np_k} QC_{i,k}^{j,l} \cdot (p_i^1 - p_i^j) \cdot xp_i^j \cdot xp_k^l \right\} <= \text{Max}_B,$$

$i \neq k$

This constraint ensures a minimum and maximum bound to the total budget cost that can later be used to compare against a budget. This constraint is at a group level.

4. Revenue Constraint $$\text{Min}_{Rev} <= \sum_{i=1}^{N_d} \left\{ \sum_{j=1}^{Np_i} QO_i^j \cdot p_i^j \cdot xp_i^j + \sum_{k=1}^{N_{crdi}} \sum_{j=1}^{Np_i} \sum_{l=1}^{Np_k} QC_{i,k}^{j,l} p_i^j \cdot xp_i^j \cdot xp_k^l \right\} <= \text{Max}_{Rev}, i \neq k$$

This constraint ensures a minimum and maximum bound to the revenue intended to be generated out of the set of products being considered for the planning period.

5. Discount Constraint

This constraint ensures a minimum and maximum bound to the price discount of a product $$\text{Min}_{disc} <= \sum_{j=1}^{Np_i} (p_i^1 - p_i^j) \cdot xp_i^j <= \text{Max}_{disc}, \forall \text{ Product } i$$

6. Margin Constraint $$\text{Min}_{margin} <= \sum_{j=1}^{Np_i} (p_i^j - c_i) \cdot xp_i^j <= \text{Max}_{margin}, \forall \text{ Product } i$$

This constraint ensures a minimum and maximum bound to the price margin of a product

7. Cross Constraints $$\sum_{j=1}^{N_{pi}} (p_{i,g,t}^j) \cdot xp_{i,g,t}^j \leq \sum_{l=1}^{N_{pk}} (p_{k,h,t}^l) \cdot xp_{k,h,t}^l \forall \text{ given items } i, k$$

These constraints ensure a relationship between attributes of different products, such as price, revenue, budget etc. Cross-sell and Up-sell constraints can also be modeled.

8. Integrality Constraint $xp_i^j \in \{0,1\}$, $\forall$ Product i and price pt j $z_{i,k}^{j,l} \in \{0,1\}$, $\forall$ Product i, corresponding price pt j, cross product k and corresponding price point l This constraint ensures that $xp_i^j$ and $z_{i,k}^{j,l}$ take only binary values (i.e. 0 or 1). (As outlined in Appendix A, the 'z' variables are introduced to linearize the bilinear terms in the constraints and objective arising from the cross-product effects).

At step 170, the optimization objective function is determined. The optimization objective is formulated as a maximization of profit, or maximization of (revenue minus total cost).

In one embodiment, the optimization objective function may be represented as:

$$\text{Maximize} \sum_{i,g=1}^{N_d} \sum_{t=1}^{N_t} \left\{ \left( \sum_{j=1}^{Np_i} QO_{i,g,t}^j \cdot (p_{i,g,t}^j) \cdot xp_{i,g,t}^j + \sum_{j=1}^{Np_i} \sum_{k=1}^{N_{Cri}} \sum_{l=1}^{Np_k} QC_{i,g,t,k}^{j,l} \cdot (p_{i,g,t}^j) \cdot xp_{i,g,t}^j \cdot xp_{k,h,t}^l \right) - \{C_{i,g,t}\} \right\} \quad (2)$$

where, i≠k $C_{i,g,t}$: total demand and supply-side cost and Subject to: Demand and supply-side constraints.

Note that the bilinear term $xp_{i,g,t}{}^j xp_{k,h,t}{}^l$ in the objective can be linearized in terms of a new variable 'z' to yield the objective function as described in Appendix A.

The terms in the maximization equation (2) have been previously determined. The own demand at price point j for product i with cross products at their base prices is represented by $QO_{i,g,t}{}^j$. The demand is determined from step 130. The price point j for product i is represented by $p_{i,g,t}{}^j$. The price points are determined from step 120. The indicator or integer variable for the selection of price point j of product i is represented by $xp_{i,g,t}{}^j$. The integer variable is determined in the demand model, where it can represent the absence or the presence of a marketing instrument. In one embodiment, price is the only marketing instrument modeled and the integer variable represents the selection or not of a price point. The aforementioned term represents the own demand of item i.

The following terms represent the cross demand of another item on the demand of item i. The cross demand on product i based on cannibalization or the halo effect is represented by the term $QC_{i,g,t,t_k}{}^{j,l}$. The cross demand is determined in the demand model. The integer variable for the selection of price point l of product k is represented by $xp_{k,h,t}{}^l$.

At step 180, an optimal solution is determined. The optimization model is executed by a solver to determine an optimal solution which simultaneously optimizes price and asset allocation for maximum profit while respecting all the modeled constraints. In order to select an optimal solution, the constraints should be satisfied and the slacks should be minimized, preferably to zero. In one embodiment, the time-phased optimal solution includes an optimal profit over the planning horizon, an optimal revenue, optimal prices, satisfied demands and optimal replenishment supplies. Moreover, optimal costs (minimized costs) may be provided. Demand-side costs may include price adjustment costs. Supply-side costs may include production costs, purchase costs, transportation costs, and inventory carrying costs. Furthermore, optimal replenishment of supplies, optimal inventory allocations for both end items and components, and optimal resource and material capacity consumptions may be provided.

Figure 2:
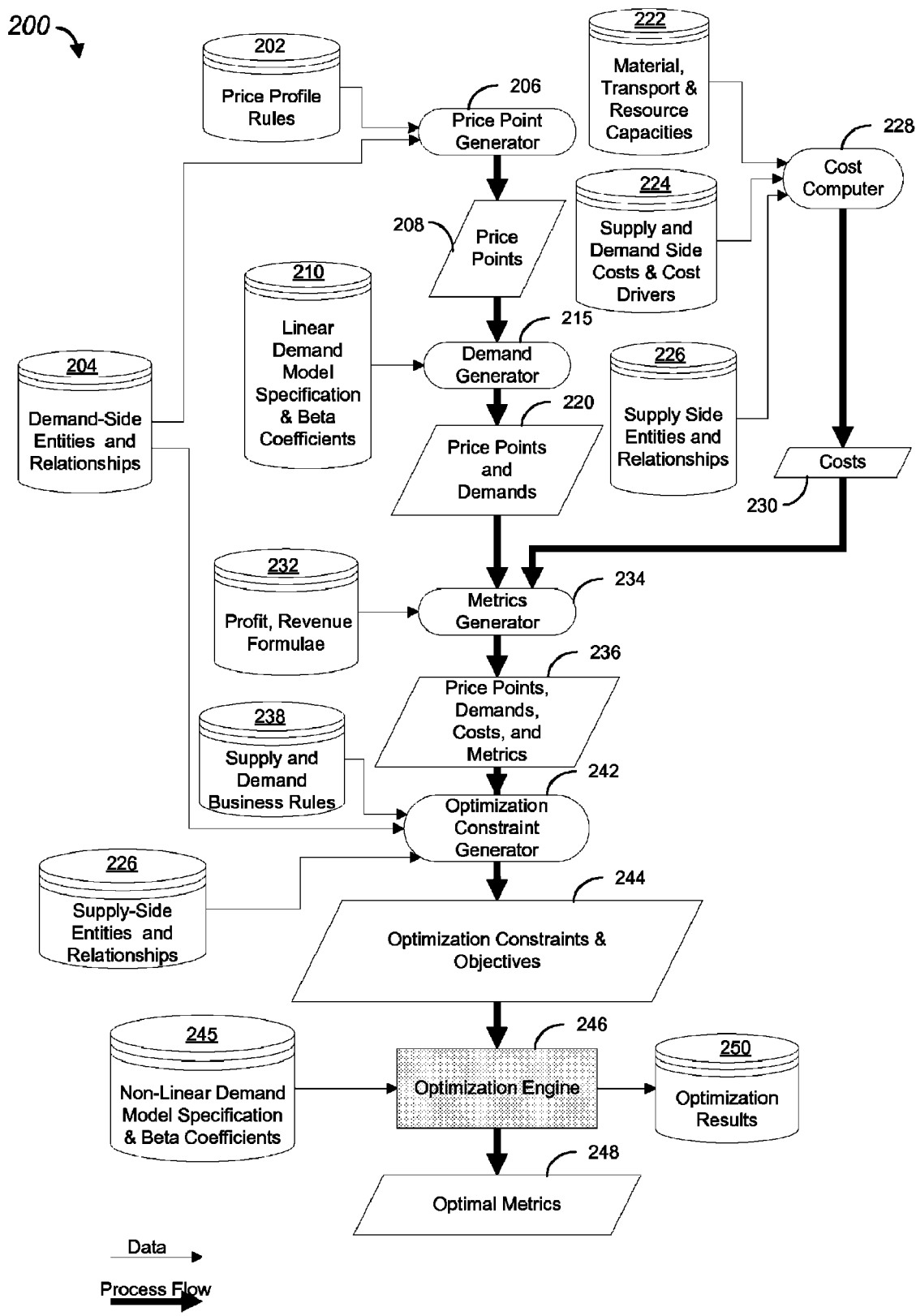
FIG. 2 is a block diagram illustrating components of an exemplary system for price optimization and an exemplary process flow among the components.

FIG. 2 is a block diagram illustrating components of an exemplary system 200 for price optimization and an exemplary process flow among the components. The price profile rules, stored in a price profile rule repository 202, are provided to a price point generator module 206. The price profile rules ensure the generated price points for an item satisfy certain defined pricing relationships and strategies, such as ending numbers rules. Demand-side entities and relationships repository 204 includes the item entities or groups of items, which is provided to the price point generator 206. All possible price points 208 for an item are then produced. In one embodiment, the price points are generated for each time phase. For example, for item A, all possible price points are generated for $t_0, t_1, t_2, \ldots, t_n$. In one embodiment, the set of possible price points are limited by the price profile rules and the demand-side entities and relationships.

User-selected demand lift confidence and corresponding quantities may be maintained within the demand-side entities and relationships repository 204. If user-selected confidence and quantities have been selected, the demand-side entities and relationships storage 204 provides the data to the price point generator 206.

Using the price points 208 and data from a linear demand model specification and beta coefficients repository 210, a demand generator 215 generates the possible own and cross demands for each item. The repository 210 may include pre-processed data, such as the linearized form of the non-linear demand model of equation (1). The repository 210 may also include Beta coefficients, which are then used by the demand generator 215 with the linear demand model to generate the predicted demand points. For each time-phased price point of an item, one or more own demands are generated. The possible cross product demands of the item based on a change in price of another item (or the presence of a marketing instrument) are also generated. Accordingly, for each time-phased price point of an item, an own demand and one or more cross demands are generated. In one embodiment, the cross demands represent either cannibalization or the affinity/halo effect. Thus, along with price points 208 and demands 220 are generated and supplied to a metrics generator 234.

The cost computer 228 determines the costs 230 associated with the item. In one embodiment, a supply-chain model of data in a material, transport, and resource capacities repository 222 is used to determine costs. Material, resource, and transport capacities repository 222 may include penalty costs for alternates and capacity violations. Supply and demand-side costs and cost driver repository 224 may include supply-side costs such as production, transportation, purchase, and carrying costs per unit. Repository 224 may include demand-side costs such as cost of price change and promotions. Furthermore, supply-side entities and relationships repository 226 may also provide data to the cost computer 228.

The metrics generator 234 generates various supply and demand metrics. The metrics generator 234 produces a set of metrics 236 to monitor the performance of the supply-side from the supply-chain model and the demand-side from the demand model, which are both incorporated into the objective function. The price points 208, demands 215, costs 230, and metrics 236 are supplied to a constraint generator 242.

The constraint generator 242 produces supply and demand-side constraints, which are used to perform constraint-based optimization. The objective function is modeled subject to both of the supply and demand-side constraints. The constraints may be generated based on metrics, which are converted into mathematical form. Constraints may also be based on data provided by the supply and demand business rules repository 238. Business rules in general are used to implement business policies. The repository 238 may include demand-side business rules such as margin, revenue, and cross item business rules. The repository 238 may include supply-side business rules such as capacity and lead time constraints, material balance equations and slack variables to model capacity violations. Furthermore, the constraints may also be generated from data of the demand-side entities and relationship repository 204 and the data of the supply-side entities and relationships repository 240. Repository 240 may include the supply-chain network model such as item-organization-time bucket entities, sourcings, BOM including substitute components, resource capacities and supplier capacities. Supply-side constraints such as material balance equations and slack variables may also be included in the supply-side entities and relationships repository 240.

Although supply and demand-side constraints have been considered in prior art supply-chain management systems and price optimization systems, respectively, the constraints and objective produced by the generator 242 treat price as a decision variable, rather than a constant. Both supply-side and demand-side constraints are considered together for the optimization. Additionally, one or more of the generated constraints may link together the pricing side and the demand-side of optimizations, such as the joining constraint for price/demand selection.

The constraint generator 242 provides the generated supply and demand-side constraints and objectives 244 to an optimization engine 246. The optimization engine 246 receives non-linear demand and Beta coefficients from repository 245. The optimization results are either returned and/or stored in repository 250. The optimization engine 246 determines the optimal price, among the set of possible time-phased price points, the optimal demand, among the set of possible demands for each price point, the optimal revenues, the optimal profits for the selected planning horizon, optimal demand-side costs for the item, optimal supply-side costs for the item, optimal replenishment of supplies to make the end items and components, optimal inventory allocations for end items and their components, and the optimal resource and material capacity consumptions. In one embodiment, the optimal solution is a selection of a single value for each of the preceding dimensions of supply and price/demand. Optimal metrics 248 are also determined by applying the nonlinear demand and beta coefficients from 245 to the optimal solution from 246. In one embodiment, the optimal metrics 248 are a true measurement of the optimization results produced by the engine 246.

Figure 3:
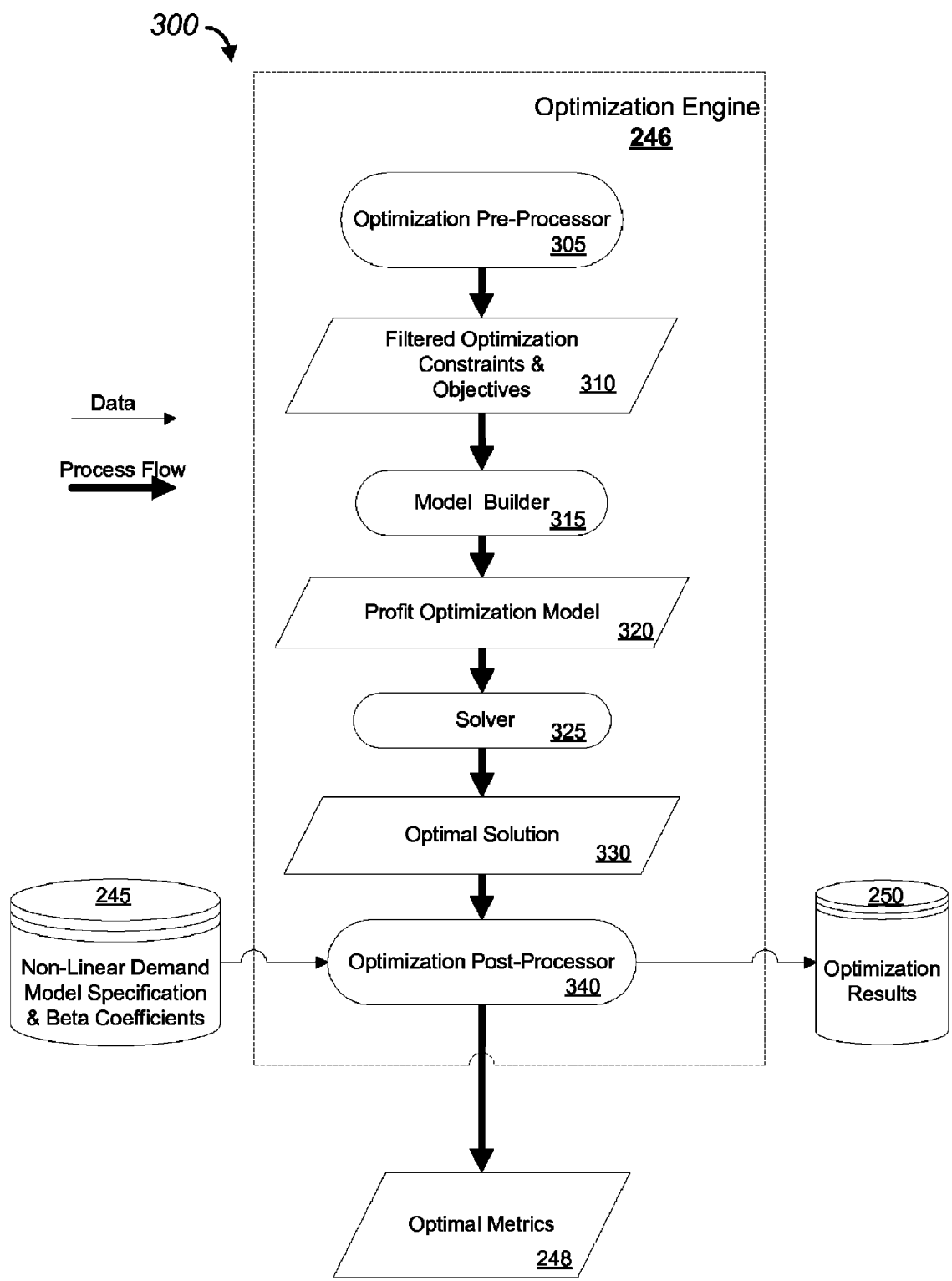
FIG. 3 is a block diagram illustrating components of an exemplary optimization engine and an exemplary process flow among the components of the optimization engine.

FIG. 3 is a block diagram illustrating components of an exemplary optimization engine 246 and an exemplary process flow among the components of the optimization engine. In one embodiment, the optimization engine 246 includes a pre-processor 305. The pre-processor 305 filters constraints 310 of the generated constraints 244 which need not be input to a MILP solver 325 in their raw form. Some redundant constraints are filtered and others are subsequently transformed into a form that is acceptable to the MILP solver. For example, logical constraints are filtered and transformed into linear form. Moreover, discontinuous constraints, such as for ranges, may also be filtered and transformed.

In one embodiment, the filtered constraints as well as MILP solvable constraints generated in step 160 are used to generate the optimization objective function 320. An optimization objective function is generated, subject to the filtered constraints 310 as well as the remaining unfiltered constraints of optimization constraints and objectives 244. The solver 325 examines the feasible solution set determined by the constraints and picks the optimal solution 330. The optimal solution 330 is determined using the linear demand model. The optimal solution 330 includes the outputs as previously described.

In one embodiment, the optimization post-processor 340 receives the non-linear demand model specification and the determined Beta coefficients from repository 245 and feeds the optimal price points from the optimal solution 330 into the non-linear demand model. This generates better estimates of the demand and metrics 248, such as revenue and margin. The generated optimization results may be stored in the repository 250. In one embodiment, post-processing may be selectively omitted, whereby the optimal solution 330 is stored in the optimization results repository 250 and/or provided to an end user.

Figure 4:
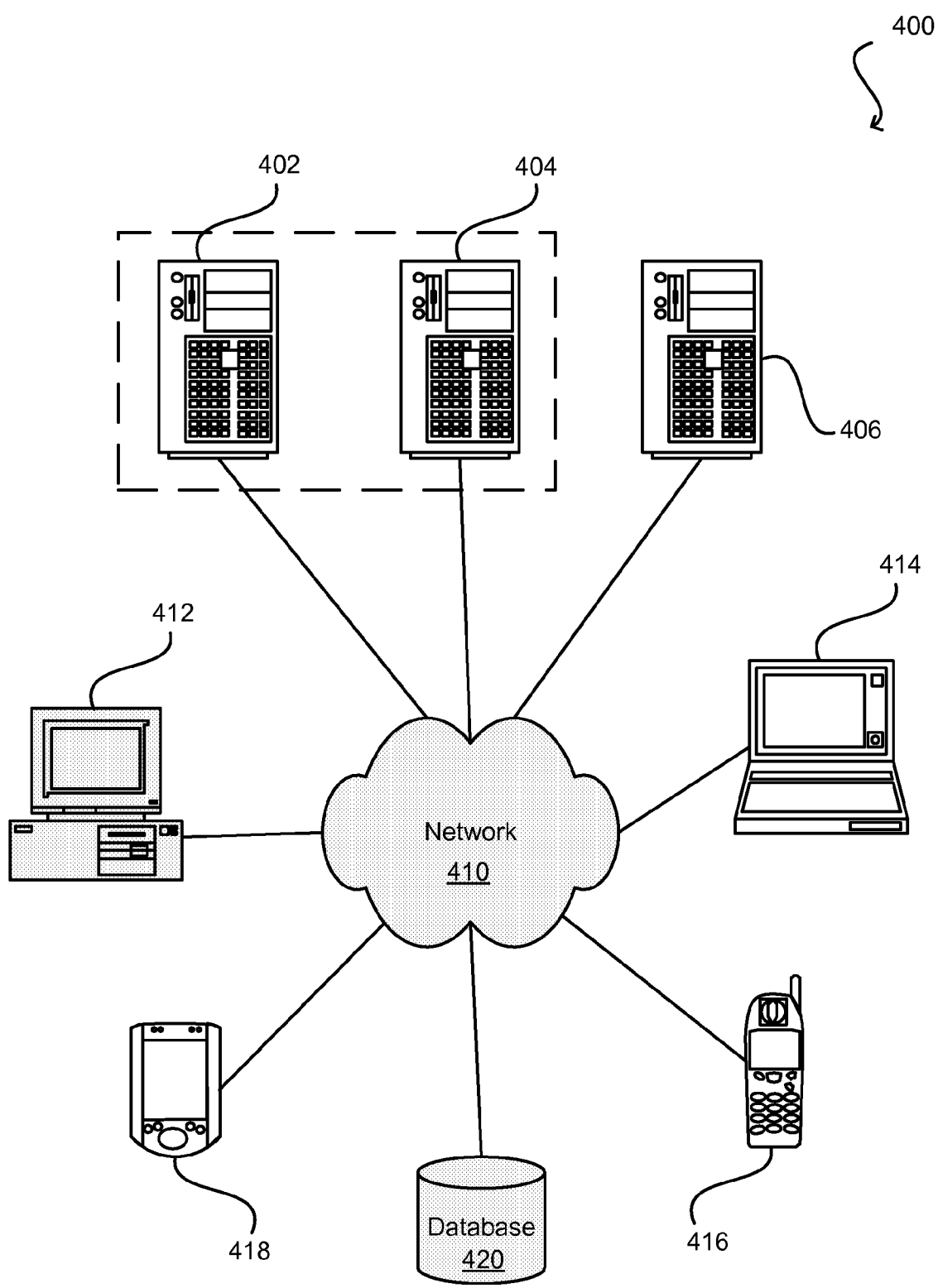
FIG. 4 is a block diagram illustrating components of an exemplary operating environment in which various embodiments of the present invention may be implemented.

FIG. 4 is a block diagram illustrating components of an exemplary operating environment in which various embodiments of the present invention may be implemented. The system 400 can include one or more user computers, computing devices, or processing devices 412, 414, 416, 418, which can be used to operate a client, such as a dedicated application, web browser, etc. The user computers 412, 414, 416, 418 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 412, 414, 416, 418 may also have any of a variety of applications, including one or more development systems, database client and/or server applications, and Web browser applications. Alternatively, the user computers 412, 414, 416, 418 may be any other electronic device, such as a thin-client computer, Internet-enabled gaming system, and/or personal messaging device, capable of communicating via a network (e.g., the network 410 described below) and/or displaying and navigating Web pages or other types of electronic documents. Although the exemplary system 400 is shown with four user computers, any number of user computers may be supported.

In most embodiments, the system 400 includes some type of network 410. The network can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 402, 404, 406 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 406) may be dedicated to running applications, such as a business application, a Web server, application server, etc. Such servers may be used to process requests from user computers 412, 414, 416, 418. The applications can also include any number of applications for controlling access to resources of the servers 402, 404, 406.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 412, 414, 416, 418. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 412, 414, 416, 418.

The system 400 may also include one or more databases 420. The database(s) 420 may reside in a variety of locations. By way of example, a database 420 may reside on a storage medium local to (and/or resident in) one or more of the computers 402, 404, 406, 412, 414, 416, 418. Alternatively, it may be remote from any or all of the computers 402, 404, 406, 412, 414, 416, 418, and/or in communication (e.g., via the network 410) with one or more of these. In a particular set of embodiments, the database 420 may reside in a storage-area network ("SAN") familiar to those skilled in the art. Similarly, any necessary files for performing the functions attributed to the computers 402, 404, 406, 412, 414, 416, 418 may be stored locally on the respective computer and/or remotely, as appropriate. In one set of embodiments, the database 420 may be a relational database, such as Oracle 10g, that is adapted to store, update, and retrieve data in response to SQL-formatted commands.

Figure 5:
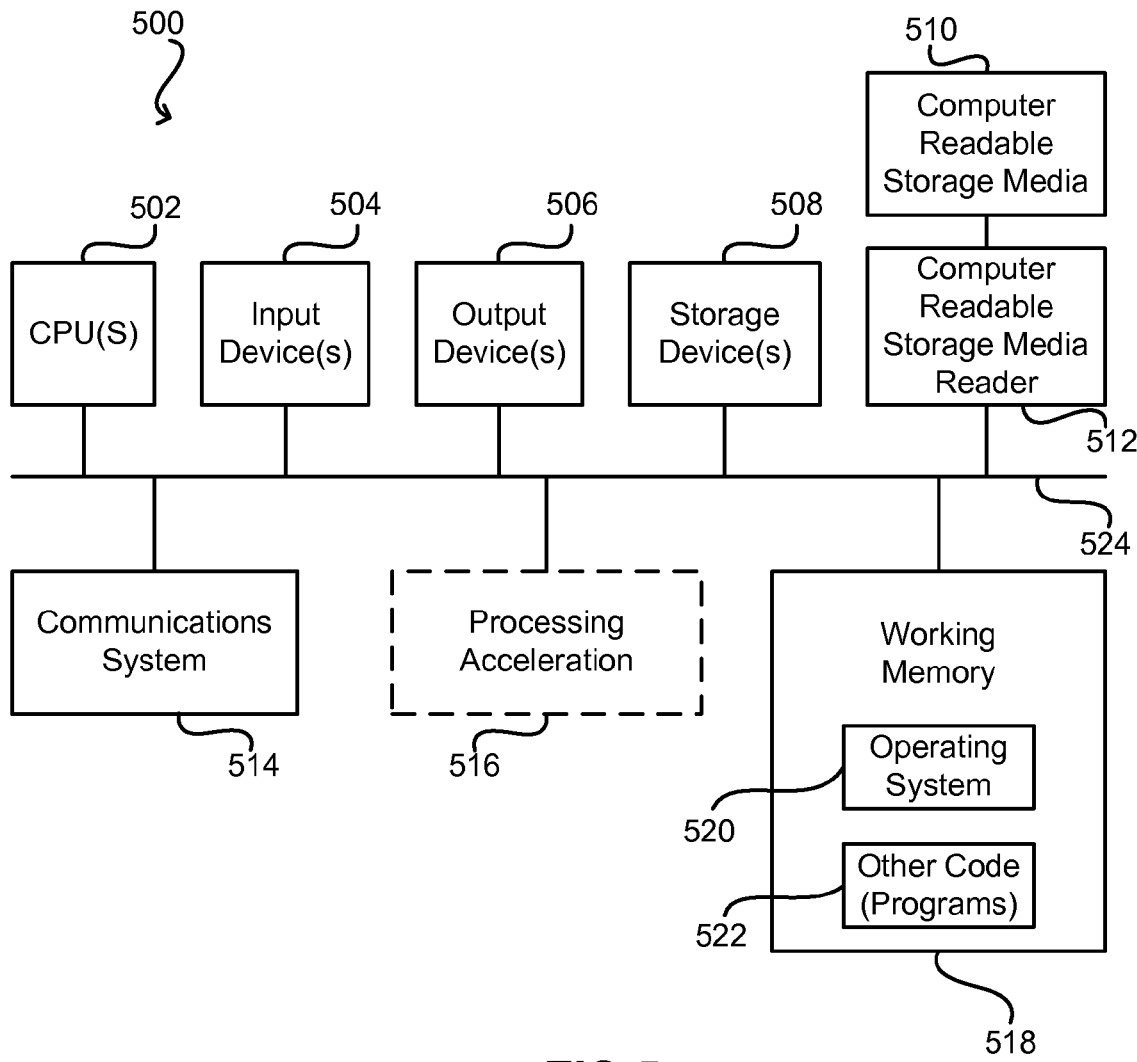
FIG. 5 illustrates an exemplary computer system in which various embodiments of the present invention may be implemented.

FIG. 5 illustrates an exemplary computer system 500, in which various embodiments of the present invention may be implemented. The system 500 may be used to implement any of the computer systems described above. The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. The communications system 514 may permit data to be exchanged with the network and/or any other computer described above with respect to the system 500.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. For example, the teachings herein may be extended to cover default configuration for other data visualizations. The scope of the invention should, therefore, be determined not with reference to the above description, but instead should be determined with reference to the pending claims along with their full scope or equivalents.

TABLE A

Indices and Demand-side Constants and Variables

Indices

| | |
|---|---|
| i | Item |
| g | Organization |
| t | Time bucket |
| d | Demand identifier (uniquely identifies item, org, time bucket, priority, and demand class type) |
| p | Process (p uniquely identifies item and org) |
| r | Resource (r does not identify an org) |
| w | Production of an item (uniquely identifies process, time bucket). Production refers to a planned order or a flow schedule. |
| v | Vendor |
| c | Carrier |
| s | Scheduled receipt id (s uniquely identifies item, org, reservation level, and due date) |

Demand-side Constants and Variables:

$p_i^j$=Price point j for product i $c_i$=Unit cost of product i $xp_i^j$=Integer variable for the price point j of product i.

$xp_i^j$=1 if price point j of product i is selected

=0 otherwise $xp_k^l$=Integer variable for the price point l of product k $xp_k^l$=1 if the price point l of product k is selected =0 otherwise $z_{j,k,l}=xp_{i,g,t}^j xp_{k,h,t}^l$ $z_{j,k,l} \in \{0,1\}$ $N_{cri}$=Number of cross impacting products for product i $N_{pk}$=Number of price points for cross product k $N_a$=Number of products (SKUs) for the a particular planning period $N_{pi}$=Number of price points for product i $N_t$=Number of time periods in the plan horizon $QO_i^j$=Own Demand at price point j for product i (with cross products at their base prices)

$QC_{i,k}^{j,l}$ = Cross demand caused by the price point l of the cross product k for the price point j of product i (This demand is due to the cannibalization or halo effect on the demand of product i due to the change in price of product k).

TABLE B

Supply-side Constants

| | |
|---|---|
| (External supply quantity of item i from vendor v to org g in time bucket t)$_{i,v,g,t}$ i.e. vendor capacity | $ESQ_{i,v,g,t}$ |
| (On hand balance of item i in org g)$_{i,g}$ | $OH_{i,g}$ |
| (Safety stock percent of item i in org g)$_{i,g}$ | $PSS_{i,g}$ |
| (Safety stock quantity of item i in org g)$_{i,g}$ | $QSS_{i,g}$ |
| (Item safety stock days of item i in org g, specified in days)$_{i,g}$ | $ISSD_{i,g}$ |
| (Resource capacity of resource r in org g in time bucket t)$_{r,t,g}$ | $RACL_{r,t,g}$ |
| (Maximum production quantity allowed using process p)$_w$ | $MTQP_w$ |
| (Process p requires item quantity of item i)$_{p,i}$ | $OCIQ_{p,i}$ |
| (Item substitute component quantity)$_{p,i,i'}$ (principal item = i, substitute = i') | $ISCQ_{p,i,i'}$ |
| (Resource requirement of resource r in to process p)$_{r,p}$ | $OCRU_{r,p}$ |
| (Alternate resource usage)$_{r,p,r',g}$ (assumption: r and r' belong to the same org) | $ARU_{r,p,r',g}$ |
| (Estimated days before end of process)$_p$ (This is the fixed lead time) | $OEDBEP_p$ |
| (Estimated days for transfer from org g to org g' using carrier c)$_{c,g,g'}$ | $OEDT_{c,g,g'}$ |
| (Estimated transit days for buy from vendor v to org g using carrier c)$_{c,v,g}$ | $OEDT_{c,v,g}$ |
| (Quantity of item from scheduled receipt s)$_s$ | $WOQ_s$ |
| (Quantity of item i through purchase order from vendor v to org g in time t)$_{i,v,g,t}$ | $QPO_{i,v,g,t}$ |
| (Quantity of item i that is demanded due to scheduled receipt s)$_{i,s}$ | $WOQDD_{i,s}$ |
| (Number of hours of resource required for scheduled receipt s)$_{r,s}$ | $OPH_{r,s}$ |
| (Shipment cost per unit weight on carrier c between org g and org g')$_{c,g,g'}$ | $CPC_{c,g,g'}$ |
| (Shipment cost per unit weight on carrier c between vendor v and org g)$_{c,v,g}$ | $CPC_{c,v,g}$ |
| (Transportation weight capacity for carrier c between org g and org g')$_{c,g,g'}$ | $WTC_{c,g,g'}$ |
| (Transportation volume capacity for carrier c between org g and org g')$_{c,g,g'}$ | $VTC_{c,g,g'}$ |
| (Transportation weight capacity for carrier c between vendor v and org g)$_{c,v,g}$ | $WTC_{c,v,g}$ |
| (Transportation volume capacity for carrier c between vendor v and org g)$_{c,v,g}$ | $VTC_{c,v,g}$ |
| (Distribution center volume capacity at org g)$_g$ | $DCC_g$ |
| (Volume of item i)$_i$ | $VOL_i$ |
| (Weight of item i)$_i$ | $WT_i$ |
| (Unit cost of item i in org g)$_{i,g}$ | $CSTG_{i,g}$ |
| (Process cost of item i in org g)$_{i,w}$ | $CSTW_{i,g}$ |
| (Cost of item i supplied by vendor v)$_{i,v}$ | $CSTV_{i,v}$ |
| (Interest rate in org for calculating inventory carrying cost)$_g$ | $h_g$ |
| (List price for item i in org g)$_{i,g}$ | $LP_{i,g}$ |
| (Sourcing allocation percentage of 'buy' item i from vendor v to org g in time bucket t)$_{i,v,g,t}$ (not used currently) | $APB_{i,v,g,t}$ |
| (Sourcing allocation percentage of 'transfer' item i from org g to org g' in time bucket t)$_{i,g,g',t}$ (not used currently) | $APT_{i,g,g',t}$ |
| (Sourcing allocation percentage of 'make' item i at org g in time bucket t)$_{i,g,t}$ (not used currently) | $APM_{i,g,t}$ |
| (Penalty cost of unmet demand)$_d$ | $PCU_d$ |
| (Penalty cost of late demand d)$_d$ | $PCD_d$ |
| (Penalty cost for safety stock violation)$_{i,g}$ | $PCSS_{i,g}$ |
| (Penalty cost for resource over-utilization)$_{r,g}$ | $PCRO_{r,g}$ |
| (Penalty cost for supplier capacity over-utilization)$_{i,v,g}$ | $PCSO_{i,v,g}$ |
| (Penalty cost for carrier weight capacity over-utilization between org g and org g')$_{c,g,g'}$ | $PWTC_{c,g,g'}$ |
| (Penalty cost for carrier volume capacity over-utilization between org g and org g')$_{c,g,g'}$ | $PVTC_{c,g,g'}$ |
| (Penalty cost for carrier weight capacity over-utilization between vendor v and org g)$_{c,g,g'}$ | $PWTC_{c,v,g}$ |
| (Penalty cost for carrier volume capacity over-utilization between vendor v and org g)$_{c,g,g'}$ | $PVTC_{c,v,g}$ |
| (Penalty cost for unmet work orders)$_s$ | $PCWO_s$ |
| (Penalty cost for distribution center capacity violation)$_g$ | $PDCC_g$ |

TABLE C

Supply-side Variables

| | |
|---|---|
| (Material flow in independent demand)$_{i,g,d,t}$ Will be late if t > t(d), on-time if t = t(d | $XFIDQ_{i,g,d,t}$ |
| Selected independent demand | $XIDQ$ |
| (Projected available of item at end of time bucket t)$_{i,g,t,l}$ | $XPA_{i,g,t}$ |
| (Safety stock demand of item in org at time bucket)$_{i,g,t}$ | $XPSS_{i,g,t}$ |
| (Safety stock buckets of item i in org g in time bucket t)$_{i,g,t}$ | $XSSB_{i,g,t}$ |
| (Production w consumes resource volume r)$_{w,o,r}$ {represents transportation resource for transfer operations} | $XCOCRV_{w,o,r}$ |
| (Production w consumes resource volume r as a substitute for r')$_{w,o,r,r'}$ | $XCOCRVR_{w,r,r'}$ |

TABLE C-continued

Supply-side Variables

| | |
|---|---|
| (Average utilization of resource r in org g)$_{r,g}$ | XAVGR$_{r,g}$ |
| (Difference between actual resource utilization of resource r in org g in time t and average resource utilization of resource r in org g)$_{r,t,g}$ | XRDEV$_{r,t,g}$ |
| (Units of item i transported on carrier c from org g to org g' in time t)$_{i,c,g,g',t}$ | XUITC$_{i,c,g,g',t}$ |
| (Units of item i transported on carrier c from vendor v to org g in time)$_{i,c,v,g,t}$ | XVITC$_{i,c,v,g,t}$ |
| (Lot size multiplier for item from external supplier)$_{i,v,g,t}$ | XLSMOE$_{i,v,g,t}$ |
| (Lot size multiplier for item at org for production)$_{i,g,t}$ | XLSMOP$_{i,g,t}$ |
| (Quantity of scheduled receipt s that is satisfied in time bucket t)$_{s,t}$ Will be late if t > t(s) | XWOQ$_{s,t}$ |
| (Quantity of item i demanded in time bucket t for scheduled receipt s)$_{i,s,t}$ | XWOQDD$_{i,s,t}$ |
| (Number of hours of resource r used for scheduled receipt s in time t)$_{r,s,t}$ | XOPH$_{r,s,t}$ |
| (Total quantity produced by process w)$_w$ | TQPIP$_w$ |
| (Total quantity of i' pegged to demand from w in substitute of i)$_{i',w,i}$ | TQCO$_{i',w,i}$ |
| (Unavailable resource quantity)$_{r,t,g}$ | SRACL$_{r,t,g}$ |
| (Unmet demand quantity)$_d$ | SIDQ$_d$ |
| (Unavailable safety stock quantity)$_{i,g,t}$ | SSSQ$_{i,g,t}$ |
| (Unavailable external supply quantity)$_{g,i,v,t}$ | SESQ$_{i,v,g,t}$ |
| (Unavailable storage volume capacity at org g)$_g$ | SDCC$_{g,t}$ |
| (Unavailable weight capacity on carrier c between org g and org g')$_{c,g,g'}$ | SWTC$_{c,g,g',t}$ |
| (Unavailable volume capacity on carrier c between org g and org g')$_{c,g,g'}$ | SVTC$_{c,g,g',t}$ |
| (Unavailable weight capacity on carrier c between vendor v and org g)$_{c,v,g}$ | SWTC$_{c,v,g,t}$ |
| (Unavailable volume capacity on carrier c between vendor v and org g)$_{c,v,g}$ | SVTC$_{c,v,g,t}$ |
| (Unmet quantity of scheduled receipt s)$_s$ | SWOQ$_s$ |

APPENDIX A: Linearize Bi-linear Term in Objective Function

Note that the bilinear term $xp_{i,g,t}^j xp_{k,h,t}^l$ in the objective in Eqn (2) can be linearized by introducing 'z' as follows:

$$\text{Maximize} \sum_{i,g=1}^{N_d} \sum_{t=1}^{N_t} \left\{ \left\{ \sum_{j=1}^{N_{p_i}} QO_{i,g,t}^j \cdot (p_{i,g,t}^j) \cdot xp_{i,g,t}^j + \sum_{j=1}^{N_{p_i}} \sum_{k=1}^{N_{cri}} \sum_{l=1}^{N_{p_k}} QC_{i,g,t,k}^{j,l} \cdot (p_{i,g,t}^j) \cdot z_{j,k,l} \right\} - \{C_{i,g,t}\} \right\} \quad (3)$$

where:

$$z_{j,k,l} = xp_{i,g,t}^j xp_{k,h,t}^l$$

$$z_{j,k,l} \in \{0,1\} \quad (4)$$

The constraint in Equation (4) is of the type z=xy and is bilinear and can be replaced by four linear constraints which are equivalent:

$$x+y-z \leq 1$$

$$x+y-z \geq 0$$

$$x-y+1 \geq z$$

$$y-x+1 \geq z \quad (5)$$

This bilinear term occurs in other constraints in the problem formulation as well and may be linearized in similar fashion.

APPENDIX B: Linear Approximation of the MRM

In general, demand is a non-linear function of price and marketing instruments. One example of a non-linear demand function includes:

$$Q_x = Q_{0x} \cdot (P_{ex}/P_{bx})^{-\beta_x} \cdot \prod_p \left( \left( \prod_y (P_{ey}/P_{by}) \right)^{\beta_x^p} \left( \prod_i \exp(\gamma_{ia} - I\{M_i\}) \right) \right), x \in p \quad -(1)$$

where $Q_x$=the sales volume (total demand) of FE x and is dependent on $Q_{0x}$=baseline demand of FE x $P_{ex}$=Effective Price of FE x $P_{bx}$=Base/List Price of FE x $P_x = P_{ex}/P_{bx}$(Effective Price x)/(List Price x) is the price ratio of FE x $\beta_x$=own-price elasticity of FE x $P_y = (P_{ey}/P_{by})$=(Effective Price y)/(List Price y) is the price ratio of a cross-impacting FE (y) within a pool (p)

$\beta_x^p$=cross-price elasticity of pool (p) upon FE x (either cannibalization or affinity/halo effect)

$\gamma_{ia}$=coefficient of marketing instrument i for FE a $I\{M_i\}$=indicator variable for existence of marketing instrument i Note: The pools taken into account are the ones which have a forecasting entity (FE) y→FE x. In one embodiment, a forecasting entity is an item. Each such impacting relationship within a pool shares the same pool coefficient.

The price elasticity coefficients 13 are obtained by conducting a multivariate linear regression (MLR) on historical demand data and fitting it to a logarithmic transform of equation (1). The MLR solves for Beta coefficients in the regression. The MLR equation takes the form $y=b_1x_1+b_2x_2+\ldots+b_nx_n+c$. The beta values are the regression coefficients, representing the relationship between several independent or predictor variables (e.g., $x_1, x_2 \ldots x_n$) and a dependent or criterion variable (e.g., y). The c is the constant, where the regression line intercepts the y axis, representing the amount the dependent y will be when all the independent variables are 0.

The Optimization solver uses the Mixed Integer Programming approach, selecting the optimal prices from among the price points determined in Price Point Generation. The decision variables are the indicator (0/1) variables corresponding to the allowed price points.

Because the nature of the optimization problem is a mixed integer quadratic constrained program, which is then transformed into a mixed integer linear program, the demand function of each FE needs to be linearized with respect to the cross impacting FEs. There are two levels of approximation, which achieve this.

First Approximation

The first approximation is called the Taylor's first order approximation.
For, any function $f(x)$, the Taylor's series expansion is given by $$f(x) = f(x^0) + \frac{\partial f(x)}{\partial x}\bigg|_0 (x-x_0) + \frac{\partial^2 f(x)}{\partial x^2}\bigg|_0 \frac{(x-x_0)^2}{2!} + \frac{\partial^3 f(x)}{\partial x^3}\bigg|_0 \frac{(x-x_0)^3}{3!} + \ldots$$

The above expansion shown above is up to the third order. The linear approximation is achieved by neglecting second-degree order and higher terms. This implies that:

$$f_{approx}(x) \cong f(x^0) + \frac{\partial f(x)}{\partial x}\bigg|_0 (x-x_0)$$

Applying the above principle to the MRM, the following derivations can be made $(1+X)^n \approx 1+nX$, n>0

Re-arranging the terms of the demand function we get, $$Q_x = Q_x^O \cdot Q_x^{MI} \cdot \prod_p \left(\prod_y P_y\right)^{\beta_x^p}, \{x, y\} \in p \qquad -(1.1)$$

where,
$Q_x^O$=demand due to baseline demand of product x and own price effect
$Q_x^{MI}$=demand due to marketing instruments $$\prod_p \left(\prod_y P_y\right)^{\beta_x^p} = \left(\prod_{y \in p} \{P_y^p\}^{\beta_x^p}\right), \{x, y\} \in p$$

∵ (Expanding the left hand side equation and expressing all the FEs within a pool with a pool ID denoted as p and pool coefficient $\beta_x^p$. Hence p varies according to the FE y and FE x taken into account)

$$\left(\prod_y \{P_y^p\}^{\beta_x^p}\right) = \left(\prod_y \{1 + P_y^p - 1\}^{\beta_x^p}\right), \{x, y\} \in p \qquad -(1.2)$$

$$= \left(\prod_y \{1 + (P_y^p - 1)\}^{\beta_x^p}\right), \{x, y\} \in p$$

$$\approx \left(\prod_y \{1 + \beta_x^p(P_y^p - 1)\}\right), \{x, y\} \in p \because$$

(Taylor's first order approximation)

Second Approximation

The second approximation is called the pair-wise approximation where it is assumed that the cross impacts are in pairs. For example, if FE(a) is impacted by FE(b) and FE(c), we will assume that FE(a) is impacted by FE(b), with FE(c) at its base price and FE(a) is impacted by FE(c), with FE(b) at its base price.
From the first approximation, we have $$\left(\prod_y \{P_y^p\}^{\beta_x^p}\right) \approx \left(\prod_y \{1 + \beta_x^p(P_y^p - 1)\}\right) \qquad -(1.3)$$

$$\approx (\{1 + \beta_x^{p1}(P_{y1}^{p1} - 1)\} \cdot \{1 + \beta_x^{p1}(P_{y2}^{p1} - 1)\} \cdot$$
$$\{1 + \beta_x^{p2}(P_{y3}^{p2} - 1)\} \ldots \cdot \{1 + \beta_x^p(P_y^p - 1)\})$$

∵ (Expanding the above right hand side equation (1.3). Note that the total number of pools having cross impacts are p and total no of FEs taking into account all the pools are y.)

$\approx (1+\beta_x^{p1}(P_{y1}^{p1}-1)+\beta_x^{p1}(P_{y2}^{p1}-1)+\beta_x^{p2}-1) \ldots +\beta_x^p(P_y^p-1)$ ∵ (Ignoring the second order and higher order terms)

$$\approx \approx \left(\left\{1 + \sum_y \beta_x^p(P_y^p - 1)\right\}\right) \qquad -(1.4)$$

$$\therefore Q_x \approx Q_x^O \cdot Q_x^{MI} \cdot \left(\left\{1 + \sum_y \beta_x^p(P_y^p - 1)\right\}\right) \qquad -(1.5)$$

$$\therefore Q_x \approx Q_x^O \cdot Q_x^{MI} \cdot (\{1 + X_{factor}\}) \qquad -(1.6)$$

$$Q_x \approx Q_x^O \cdot Q_x^{MI} + Q_x^O \cdot Q_x^{MI} \cdot X_{factor} \qquad -(1.7)$$

$$Q_x \approx QO + QC$$

i.e. the total demand can be approximated as a sum of the own and the cross demands. Eqn. 1.7 is used in the MILP formulation of the profit maximization objective function.

This linearization suffices for the case where prices are unknown but marketing instruments are absent or are known. The case where marketing instruments are also unknown can be handled by an extension of the above linearization procedure.

What is claimed is:
1. A computer-implemented method for simultaneously pricing an item in a product hierarchy and allocating assets in a supply chain, the method comprising:

determining a set of price points for the item in the product hierarchy;

determining a value corresponding to a price elasticity of the item;

determining a value corresponding to a price elasticity of a correlated item;

prior to determining a set of expected demand values, determining a non-linear demand model based on a baseline demand of the item, the price elasticity of the item, a cross demand of the item created by the price elasticity of the correlated item, and a demand of the item created by a marketing instrument;

transforming the non-linear demand model into a linear demand model;

determining, by at least one processor associated with a computer system, a set of expected demand values for each price point for the item using the linear demand model, the value corresponding to the price elasticity of the item, the value corresponding to the price elasticity of the correlated item, and the set of price points, the set of expected demand values able to model demand uncertainty for each price point;

determining a supply-side constraint which models inventory, replenishment, and capacities associated with replenishment of the product hierarchy;

determining a joining constraint which requires that a selected set of expected demand values be equal to a net planned supply of the item;

determining a demand-side constraint;

determining an objective function, by the at least one processor associated with the computer system, to maximize revenue and minimize costs simultaneously based on the set of price points for the item, the set of expected demand values for the item, and subject to the supply-side constraint, the joining constraint, and the demand-side constraint; and providing an optimal price profile for the item based on the objective function.

2. The method of claim 1, further comprising:
based on the objective function, providing optimal profits over a plan horizon for the item, optimal revenue for the item, optimal satisfied demand for the item, optimal demand-side costs and supply-side costs for the item, optimal quantity of replenishment supplies associated with the item, optimal inventory allocations for the item, optimal resource capacity consumption for the item, and optimal material capacity consumption for the item.

3. The method of claim 1, further comprising:
determining a supply-side cost incurred for the item, wherein the supply-side cost includes a cost of replenishment associated with the item, wherein the objective function is determined based on the supply-side cost.

4. The method of claim 1, further comprising:
determining a demand-side cost incurred for the item, wherein the demand-side cost models a cost associated with a change in price of the item, wherein the objective function is determined based on the demand-side cost.

5. The method of claim 1, wherein the objective function maximizes profits based on a set of supply-side slack variables which enforce a penalty for a usage of at least one of an unavailable resource quantity, an unmet demand quantity, an unavailable safety stock quantity, an unavailable external supply quantity, an unavailable storage volume capacity at an organization, an unavailable storage volume capacity on a carrier, and an unavailable weight capacity on the carrier.

6. The method of claim 1, wherein the item in the product hierarchy is a manufacturing item.

7. The method of claim 1, wherein the item in the product hierarchy is at least one of an end item, a component of an end item, and a product family.

8. The method of claim 1, wherein the set of price points are generated subject to a price profile rule.

9. The method of claim 1, wherein the cross demand of the item is determined based on an aggregation of a plurality of price elasticity values of the correlated item upon the item.

10. The method of claim 1, wherein the set of price points, the set of expected demand values, the supply-side constraint, the joining constraint, and the demand-side constraint are determined for each time phase, and wherein the optimal price profile for the item includes an optimal price per time phase.

11. The method of claim 1, further comprising:
generating supply metrics and demand metrics; and
determining the optimal price based on the supply metrics and the demand metrics.

12. A system for simultaneously pricing an item in a product hierarchy and allocating assets in a supply chain, the system comprising:
at least one processor;
a memory device operatively coupled to the processor;
a price point generator configured, by the at least one processor, to determine a set of price points for the item in the product hierarchy;
a demand generator configured, by the at least one processor, to determine a set of expected demand values for each price point for the item able to model demand uncertainty for each price point using a linear demand model, a value corresponding to a price elasticity of the item, a value corresponding to a price elasticity of a correlated item, and the set of price points, the linear demand model determined based at least in part upon a non-linear demand model transformation, the non-linear demand model determined based at least in part upon a baseline demand of the item, the price elasticity of the item, a cross demand of the item created by the price elasticity of a correlated item, and a demand of the item created by a marketing instrument;
an optimization constraint generator configured, by the at least one processor, to determine a supply-side constraint which models inventory, replenishment, and capacities associated with replenishment of the product hierarchy, a joining constraint which requires that a selected set of expected demand values be equal to a net planned supply of the item, and a demand-side constraint;
a model builder configured, by the at least one processor, to determine an objective function to maximize revenue and minimize costs simultaneously based on the set of price points for the item, the set of expected demand values for the item, and subject to the supply-side constraint, the joining constraint, and the demand-side constraint; and
a solver configured, by the at least one processor, to provide an optimal price profile for the item based on the objective function.

13. The system of claim 12, wherein the solver is further configured to provide, based on the objective function, optimal profits over a plan horizon for the item, optimal revenue for the item, optimal satisfied demand for the item, optimal demand-side costs and supply-side costs for the item, optimal quantity of replenishment supplies associated with the item, optimal inventory allocations for the item, optimal resource capacity consumption for the item, and optimal material capacity consumption for the item.

14. The system of claim 12, further comprising:
a cost computer configured to determine a supply-side cost incurred for the item, wherein the supply-side cost includes a cost of replenishment associated with the item, wherein the objective function is determined based on the supply-side cost.

15. The system of claim 12, further comprising:
a cost computer configured to determine a demand-side cost incurred for the item, wherein the demand-side cost models a cost associated with a change in price of the item, wherein the objective function is determined based on the demand-side cost.

16. The system of claim 12, wherein the objective function maximizes profits based on a set of supply-side slack variables which enforce a penalty for usage of at least one of an unavailable resource quantity, an unmet demand quantity, an unavailable safety stock quantity, an unavailable external supply quantity, an unavailable storage volume capacity at an organization, an unavailable storage volume capacity on a carrier, and an unavailable weight capacity on the carrier.

17. A computer program product stored on a non-transitory computer-readable medium having computer readable instructions embedded therein, which when executed by at least one processor, causing the at least one processor to implement a method for simultaneously pricing an item in a product hierarchy and allocating assets in a supply chain, the method comprising:
determining a set of price points for the item in the product hierarchy;
determining a value corresponding to the price elasticity of the item;
determining a value corresponding to the price elasticity of a correlated item;
prior to determining a set of expected demand values, determining a non-linear demand model based on a baseline demand of the item, the price elasticity of the item, a cross demand of the item created by the price elasticity of the correlated item, and a demand of the item created by a marketing instrument;
transforming the non-linear demand model into a linear demand model;
determining a set of expected demand values for each price point for the item using the linear demand model, the value corresponding to the price elasticity of the item, the value corresponding to the price elasticity of the correlated item, and the set of price points, the set of expected demand values able to model demand uncertainty for each price point;
determining a supply-side constraint which models inventory, replenishment, and capacities associated with replenishment of the product hierarchy;
determining a joining constraint which requires that a selected set of expected demand values be equal to a net planned supply of the item;
determining a demand-side constraint;
determining an objective function to maximize revenue and minimize costs simultaneously based on the set of price points for the item, the set of expected demand values for the item, and subject to the supply-side constraint, the joining constraint, and the demand-side constraint; and
providing an optimal price profile for the item based on the objective function.

18. The implemented method according to claim 17, further comprising:
providing optimal profits over a plan horizon for the item, optimal revenue for the item, optimal satisfied demand for the item, optimal demand-side costs and supply-side costs for the item, optimal quantity of replenishment supplies associated with the item, optimal inventory allocations for the item, optimal resource capacity consumption for the item, and optimal material capacity consumption for the item, based on the objective function.

19. The computer program product according to claim 17, wherein the objective function maximizes profits based on a set of supply-side slack variables which enforce a penalty for usage of at least one of an unavailable resource quantity, an unmet demand quantity, an unavailable safety stock quantity, an unavailable external supply quantity, an unavailable storage volume capacity at an organization, an unavailable storage volume capacity on a carrier, and an unavailable weight capacity on the carrier.

* * * * *

UNITED STATES PATENT AND TRADEMARK OFFICE
CERTIFICATE OF CORRECTION

| | |
|---|---|
| PATENT NO. | : 7,921,061 B2 |
| APPLICATION NO. | : 11/850558 |
| DATED | : April 5, 2011 |
| INVENTOR(S) | : Rangarajan et al. |

It is certified that error appears in the above-identified patent and that said Letters Patent is hereby corrected as shown below:

In column 12, line 65, delete " $\left(\sum_{i,v,g} \sum_{c,t} XVITC_{i,c,v,g,,t} * CPC_{c,v,g}\right)$ " and insert -- $(\sum_{i,v,g} \sum_{c,t} XVITC_{i,c,v,g,t} * CPC_{c,v,g})$ --, therefor.

In column 13, line 9, delete " $\left(\sum_{i,v,g} \sum_{c,t} XVITC_{i,c,v,g,,t} * CPC_{c,v,g}\right)$ " and insert -- $(\sum_{i,v,g} \sum_{c,t} XVITC_{i,c,v,g,t} * CPC_{c,v,g})$ --, therefor.

In column 18, line 34, delete " $ISCQ_{p,i,i}=OCIQ_{p,i}$ " and insert -- $ISCQ_{p,i,i} = OCIQ_{p,i}$ --, therefor.

In column 19, line 35, delete "time" and insert -- time. --, therefor.

In column 20, line 15, delete "product" and insert -- product. --, therefor.

In column 20, line 31, delete "product" and insert -- product. --, therefor.

In column 20, line 37, delete " $\sum_{j=1}^{N_{pi}} (p^j_{i,g,t}) \cdot xp^j_{i,g,t} \leq \sum_{l=1}^{N_{pk}} (p^l_{k,h,t}) \cdot xp^l_{k,h,i}$ " and insert -- $\sum_{j=1}^{N_{pi}} (p^j_{i,g,t}) \cdot xp^j_{i,g,t} \leq \sum_{l=1}^{N_{pk}} (p^l_{k,h,t}) \cdot xp^l_{k,h,t}$ --, therefor.

In column 30, line 65, delete "13" and insert -- β --, therefor.

Signed and Sealed this
Eighteenth Day of October, 2011

David J. Kappos
*Director of the United States Patent and Trademark Office*